United States Patent
Kato et al.

(10) Patent No.: US 8,923,867 B2
(45) Date of Patent: Dec. 30, 2014

(54) MOBILE COMMUNICATION SYSTEM, BASE STATION APPARATUS AND MOBILE STATION APPARATUS

(75) Inventors: Yasuyuki Kato, Osaka (JP); Shohei Yamada, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 12/601,507

(22) PCT Filed: May 16, 2008

(86) PCT No.: PCT/JP2008/059015
§ 371 (c)(1),
(2), (4) Date: Nov. 23, 2009

(87) PCT Pub. No.: WO2008/143163
PCT Pub. Date: Nov. 27, 2008

(65) Prior Publication Data
US 2010/0173634 A1    Jul. 8, 2010

(30) Foreign Application Priority Data
May 24, 2007  (JP) ................... 2007-137662

(51) Int. Cl.
*H04W 36/00* (2009.01)
*H04W 72/00* (2009.01)
*H04W 88/02* (2009.01)
*H04W 88/08* (2009.01)

(52) U.S. Cl.
CPC .......... *H04W 36/0055* (2013.01); *H04W 88/02* (2013.01); *H04W 88/08* (2013.01)
USPC .......................................... 455/437; 455/450

(58) Field of Classification Search
USPC ........... 455/437, 452.1, 450, 452.2, 436, 438, 455/439, 451, 453
See application file for complete search history.

(56) References Cited

U.S. PATENT DOCUMENTS 6,597,675 B1 *  7/2003  Esmailzadeh et al. ........ 370/335
6,778,835 B2 *  8/2004  You et al. ...................... 455/455

(Continued)

FOREIGN PATENT DOCUMENTS

EP    2083580 A1    7/2009
JP    2004-504762 A    2/2004

(Continued)

OTHER PUBLICATIONS

"Physical Channel and Multiplexing in Evolved in UTRA Uplink," NTT DoCoMo, Fujitsu, NEC, Sharp, 3GGP TSG RAN WG1 Meeting #42, London, UK, Aug. 29, 2005.

(Continued)

*Primary Examiner* — Christopher M Brandt
(74) *Attorney, Agent, or Firm* — Slater & Matsil, L.L.P.

(57) ABSTRACT

The time spent in handover is shortened when a mobile station apparatus performs random access for handover. In a mobile communication system where a mobile station apparatus 200 uses any signature of a beforehand determined signature group between the mobile station apparatus 200 and a base station apparatus 100 in random access, the base station apparatus 100 selects a signature used by the mobile station apparatus 200 in random access performed at the time of handover, and the mobile station apparatus 200 performs handover using the signature selected in the base station apparatus 100 and judges the presence or absence of transmission and reception of a handover complete message and contention resolution corresponding to the type of signature selected in the base station apparatus 100.

8 Claims, 26 Drawing Sheets

(56) References Cited

U.S. PATENT DOCUMENTS

| | | | |
|---|---|---|---|
| 2001/0046864 A1* | 11/2001 | Bhatoolaul et al. | 455/442 |
| 2005/0014508 A1* | 1/2005 | Moulsley et al. | 455/450 |
| 2005/0202818 A1* | 9/2005 | Hondo et al. | 455/434 |
| 2005/0271025 A1* | 12/2005 | Guethaus et al. | 370/342 |
| 2006/0203753 A1* | 9/2006 | Toskala et al. | 370/278 |
| 2007/0047493 A1* | 3/2007 | Park et al. | 370/331 |
| 2007/0064665 A1* | 3/2007 | Zhang et al. | 370/343 |
| 2007/0165567 A1* | 7/2007 | Tan et al. | 370/329 |
| 2007/0207788 A1* | 9/2007 | Phan et al. | 455/414.4 |
| 2007/0230600 A1* | 10/2007 | Bertrand et al. | 375/260 |
| 2007/0274334 A1* | 11/2007 | Rietman | 370/445 |
| 2007/0293224 A1* | 12/2007 | Wang et al. | 455/436 |
| 2007/0298824 A1* | 12/2007 | Ostman et al. | 455/522 |
| 2008/0188219 A1* | 8/2008 | Fischer | 455/434 |
| 2008/0267126 A1* | 10/2008 | Vujcic et al. | 370/330 |
| 2008/0267131 A1* | 10/2008 | Kangude et al. | 370/331 |
| 2008/0268849 A1* | 10/2008 | Narasimha et al. | 455/437 |
| 2008/0273503 A1* | 11/2008 | Lee et al. | 370/336 |
| 2008/0273610 A1 | 11/2008 | Malladi et al. | |
| 2009/0011769 A1* | 1/2009 | Park et al. | 455/450 |
| 2010/0067495 A1* | 3/2010 | Lee et al. | 370/335 |
| 2010/0105405 A1* | 4/2010 | Vujcic | 455/452.1 |
| 2010/0118799 A1* | 5/2010 | Lee et al. | 370/329 |

FOREIGN PATENT DOCUMENTS

| | | |
|---|---|---|
| JP | 2006296777 A | 11/2006 |
| WO | WO-02/07345 A1 | 1/2002 |
| WO | WO 2008/024788 A2 | 2/2008 |
| WO | WO-2008/024788 A2 | 2/2008 |
| WO | 2008053653 A1 | 5/2008 |

OTHER PUBLICATIONS

3GPP TR (Technical Report), "Physical Channel Procedure," 25.814, V7.0.0, Physical Layer Aspect for Evolved Universal Terrestrial Radio Access (UTRA), Jun. 2006.

3GPP TS (Technical Specification) "Evolved Universal Terrestrial Radio Access (E-UTRA) and Evolved Universal Terrestrial Radion Access Network (EUTRAN) Overal Discription Stage 2," 36.300, Vo. 90, Mar. 2007.

R2-063225 "No-Contention Based Handover Execution," 3GPP TSG RAN WG2 Meeting #56 Riga, Latvia, Nov. 6, 2006 through Nov. 10, 2006.

R-2063082, "Rach Partitioning for Handover," 3GPP TSG RAN WG2 Meeting #56 Riga, Latvia, Nov. 6, 2006 through Nov. 10, 2006.

Zte, "Non-Contention Based Handover Procedure on Rach Channel," 3GPP R2-063538, Nov. 6, 2006.

3GPP TS 36.300 V8.0.0 (Mar. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

NTT DoCoMo, Inc., "Contention-based and Contention-free Access Procedures in LTE." 3GPP TSG-RAN WG2 #57 R2-070778, Feb. 12-16, 2007, Saint-Louis, USA.

"Use of dedicated RACH signatures" 3GPP Draft; R2-071455 Dedicated Signatures_R2, 3rd Generation Partnership Project (3GPP), Mobile Competence Centre; 650, Route Des Lucioles, XP050134392.

3rd Generation Partnership Project; Technical Specification Group Radio Access Network; Physical layer aspects for evolved Universal Terrestrial Radio Access (UTRA) (Release), 3GPP TR 25.814 V7.1.0, Sep. 2006, 132 pages.

Communication of a Notice of Opposition received in Application No. 08752866.7-1857 mailed May 28, 2014, 1 page.

Notice of Opposition to a European patent received in Patent No. EP 2160043 mailed May 21, 2014, 42 pages.

Texas Instruments Inc., "Content of initial Unsynchronized RACH access and contention resolution," 3GPP TSG RAN WG2 #54, R2-062107, Tallinn, Estonia, Aug. 28-Sep. 1, 2006, 6 pages.

ZTE, "Classification of signature for non-snchronized random access," TSG-RAN Working Group 2 meeting #55, R2-062757, Seoul, Korea, Oct. 9-13, 2006, 4 pages.

ZTE, "non-contention based handover procedure on RACH channel," TSG-RAN Working Group 2 meeting #55, R2-062809, Seoul, Korea, Oct. 9-13, 2006, 4 pages.

Fujitsu, "Less-contention-based handover," 3GPP TSG-RAN-WG2 Meeting #58, R2-063325, Riga, Latvia, Nov. 6-10, 2006, 8 pages.

Nokia Siemens Networks, "Non contention based methods in HO," 3GPP TSG-RAN WG2 Meeting #58, R2-071726, Kobe, Japan, May 7-11, 2007, 8 pages.

Nokia Siemens Networks, "Update on Mobility, Security, Random Access Procedure, etc." 3GPP TSG-RAN2 Meeting #58, R2-072338, Kobe, Japan, May 7-11, 2007, 46 pages.

"Use of dedicated RACH signatures" 3GPP Draft; R2-071455 Dedicated Signatures_R2, 3rd Generation Partnership Project (3GPP), Mobile Competence Centre; 650, Route des Lucioles, XP050134392, Mar. 26-30, 2007.

* cited by examiner

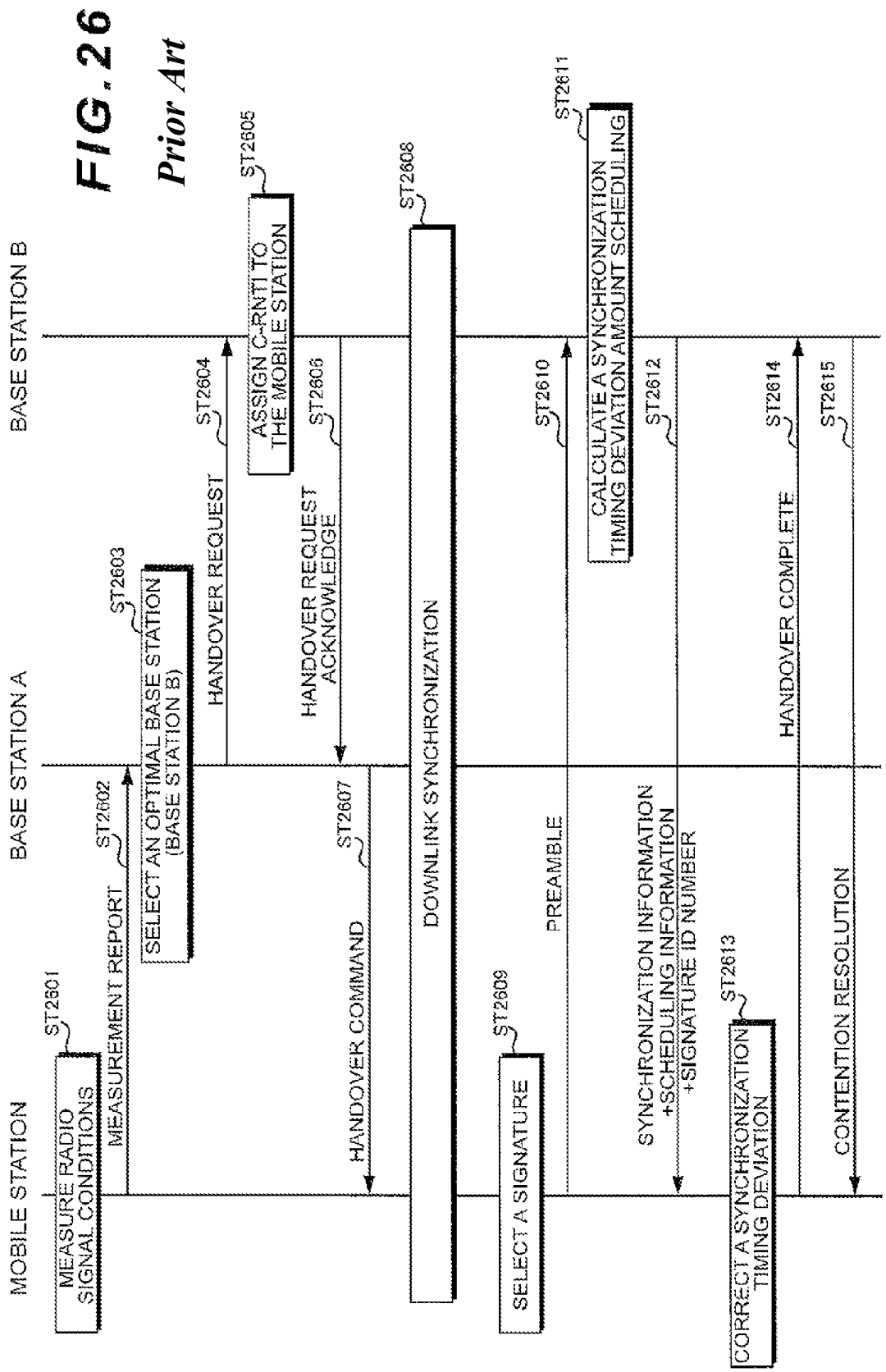

MOBILE COMMUNICATION SYSTEM, BASE STATION APPARATUS AND MOBILE STATION APPARATUS

TECHNICAL FIELD

The present invention relates to a mobile communication system, base station apparatus and mobile station apparatus using a cellular radio scheme.

BACKGROUND ART

Currently, in 3GPP (3rd Generation Partnership Project), the W-CDMA system has been standardized as a 3G cellular mobile communication system, and its service has been started sequentially. Further, HSDPA (High Speed Downlink Packet Access) with the communication speed further increased has also been standardized, and its service is being started.

Meanwhile, in 3GPP, evolution in 3rd Generation Radio Access (Evolved Universal Terrestrial Radio Access: hereinafter, referred to as "EUTRA") has been studied. As downlink in the EUTRA, an OFDM (Orthogonal Frequency Division Multiplexing) system is proposed. Further, proposed as uplink in the EUTRA is a DFT (Discrete Fourier Transform)-spread OFDM type single carrier communication system.

As shown in FIG. 22, the uplink of EUTRA is formed of an uplink pilot channel UPiCH, random access channel RACH, and uplink scheduling channel USCH (for example, see Non-Patent Document 1).

The uplink random access channel RACH of E-UTRA contains a non-synchronized random access channel and synchronized random access channel. Herein, a band of 1.25 MHz is used as a maximum unit of the non-synchronized random access channel. Then, for example, as shown in FIG. 23, a plurality of channels for access is prepared, and configured to be able to respond to a number of accesses.

Among intended purposes of the non-synchronized random access channel, it is the biggest purpose to synchronize a mobile station apparatus (hereinafter, referred as a "mobile station") and base station apparatus (hereafter, referred to as a "base station"). Further, it is considered that a mobile station transmits several-bit information to request scheduling for allocating radio resource and the like so as to decrease the connection time between the mobile station and base station. Meanwhile, the intended purpose of the synchronized random access is to make a scheduling request (for example, see Non-patent Document 2).

In the non-synchronized random access, only a preamble is transmitted to acquire synchronization. This preamble contains a signature that is a signal pattern indicative of information, and by preparing a few tens of kinds of signatures, it is possible to designate several-bit information. Currently, it is anticipated that 6-bit information is transmitted, and that 64 kinds of signatures are prepared.

In the 6-bit information, it is expected that 5 bits are assigned a random ID, while remaining 1 bit is assigned a reason of random access, downlink path-loss/CQI (Channel Quality Indicator) and the like (for example, see Non-patent Document 3).

FIG. 24 is a sequence chart to explain an example of a conventional procedure of random access. In addition, FIG. 24 shows the procedure of random access (non-synchronized random access) in the case of using a non-synchronized random access channel.

As shown in FIG. 24, in the conventional procedure of random access, a mobile station first selects a signature based on a random ID, the reason of random access, downlink path-loss/CQI information and the like (step (hereinafter, abbreviated as "ST") 2401). Then, the mobile station transmits a preamble (random access preamble) containing the selected signature on the non-synchronized random access channel (ST2402:Message 1).

Upon receiving the preamble from the mobile station, the base station calculates a synchronization timing deviation between the mobile station and base station from the preamble, and performs scheduling for transmitting an L2/L3 (Layer2/Layer3) message (ST2403). Then, the base station assigns C-RNTI (Cell-Radio Network Temporary Identity) to the mobile station requiring C-RNTI from the random access reason, and transmits a random access response including synchronization timing deviation information (synchronization information), scheduling information, signature ID number and C-RNTI (ST2404:Message 2).

Upon receiving these pieces of information from the base station, the mobile station extracts the response from the base station including the transmitted signature ID number (ST2405). Then, the mobile station transmits an L2/L3 message with radio resources subjected to scheduling in the base station (ST2406:Message 3). Upon receiving the L2/L3 message from the mobile station, the base station transmits a contention resolution to judge whether a collision occurs between mobile stations to the mobile station (ST2407:Message 4) (for example, see Non-patent Document 3).

A problem of such random access is that a collision occurs in the case that a plurality of different mobile stations selects the same signature and random access channel. When a plurality of mobile stations selects the same signature and transmits the signature with a radio resource block having the same time and frequency i.e. on the same random access channel, a collision occurs in the preamble (ST2402) as shown in FIG. 24.

When the base station cannot detect the preamble (ST2402) due to such a collision, the base station cannot send back the response (ST2404) including the synchronization information and the like to the mobile station. In this case, the mobile station cannot receive the response (ST2404) from the base station, and therefore, needs to select a signature and random access channel again after a lapse of predetermined time to per form random access.

Meanwhile, when the base station can detect the preamble (ST2402), the base station calculates L2/L3 message scheduling and synchronization timing deviation, and sends back a response (ST2404) to the mobile station. However, a plurality of mobile stations receives the response (ST2404) from the base station. Therefore, the plurality of mobile stations transmits the L2/L3 message (ST2406) with radio resources subjected to scheduling, and as a result, the collision occurs in the L2/L3 message (ST2406).

When the base station cannot detect the L2/L3 message (ST2406) due to such a collision, the base station cannot send back the response (ST2407) to the mobile stations. In this case, the mobile stations cannot receive the response (ST2407) from the base station, and therefore, need to select a signature and random access channel again after a lapse of predetermined time to perform random access. Thus, when a plurality of mobile stations selects the same signature and random access channel, the collision can occur, while when the collision occurs, the time up to ST2407 as shown in FIG. 24 is required at the maximum until the collision is detected.

Meanwhile, when a mobile station capable of executing such random access is located in a position as shown in FIG.

25, handover is executed. Also when handover is executed, the above-mentioned non-synchronized random access is performed.

Described herein is an example of a procedure of random access at the time of executing handover. FIG. 26 is a sequence chart to explain an example of a procedure of random access at the time of executing handover. In addition, as in FIG. 24, FIG. 26 shows the procedure of random access in the case of using a non-synchronized random access channel.

As shown in FIG. 26, in the procedure of random access at the time of executing handover, as a preparatory stage of handover, a mobile station first measures radio signal conditions of adjacent base stations (ST2601). Then, the mobile station transmits the measurement result (measurement report) to a base station A that is a base station (hereinafter, referred to as a "local-base station" as appropriate) currently holding the mobile station (ST2602).

Upon receiving the measurement result from the mobile station, the base station A selects an optimal base station from the measurement result (ST2603). In addition, herein, a base station B is assumed to be selected as an optimal base station. Then, the base station A transmits a handover request message to the base station B that is a handover destination (ST2604).

Upon receiving the handover request message from the base station A, the base station B assigns C-RNTI to the mobile station performing handover (ST2605). Then, as a response to the handover request, the base station B notifies the base station A of a handover request acknowledge message including the C-RNTI (ST2606).

Upon receiving the handover request acknowledge message from the base station B, the base station A transmits a handover command message including the C-RNTI to the mobile station (ST2607).

Upon receiving the handover command message from the base station A, the mobile station acquires synchronization on downlink of the base station B, and confirms a position of the random access channel from the broadcast channel (ST2608). When the downlink synchronization is acquired, the mobile station selects one signature from among signatures such that the reason of random access is handover (ST2609). Then, the mobile station transmits a preamble (random access preamble) containing the selected signature to the base station B on the random access channel (ST2610:Message 1).

Upon detecting the signature from the preamble received from the mobile station, the base station B calculates a synchronization timing deviation, and performs scheduling of uplink for the mobile station to transmit a handover complete message (ST2611). Then, the base station B transmits synchronization timing deviation information (synchronization information), scheduling information and signature ID number to the mobile station (ST2612:Message). In addition, in the case that the random access reason is handover, the mobile station is beforehand notified of C-RNTI, and therefore, the base station B does not transmit the C-RNTI.

Upon receiving the information to the mobile station from the base station B, the mobile station corrects the synchronization timing deviation based on the synchronization timing deviation information (synchronization information) (ST2613). Then, the mobile station transmits a handover complete message with radio resources subjected to scheduling to the base station B (ST2614:Message 3). Upon receiving the handover complete message from the mobile station, the base station B transmits a contention resolution to judge whether a collision occurs between mobile stations to the mobile station (ST2615:Message 4).

Thus, since random access is performed also at the time of handover, the collision is inevitable, and it is feared that it will take much time to complete handover. To avoid the fear, proposals not to cause a collision to occur in random access in handover have been made such that the base station assigns a handover random access channel to other physical resources and notifies the mobile station of using the handover random access channel, and that the base station selects a signature for handover to notify the mobile station to perform random access (for example, see Non-patent Documents 4 and 5).

Non-patent Document 1: R1-050850 "Physical Channel and Multiplexing in Evolved UTRA Uplink", 3GPP TSG RAN WG1 Meeting #42 London, UK, Aug. 29-Sep. 2, 2005

Non-patent Document 2: 3GPP TR (Technical Report) 25.814, V7.0.0 (2006-06), Physical layer aspects for evolved Universal Terrestrial Radio Access (UTRA)

Non-patent Document 3: 3GPP TS (Technical Specification) 36.300, V0.90 (2007-03), Evolved Universal Terrestrial Radio Access (E-UTRA) and Evolved Universal Terrestrial Radio Access Network (E-UTRAN), Overall description Stage 2

Non-patent Document 4: R2-063082 "No-contention based handover execution", 3GPP TSG RAN WG2 Meeting #56 Riga, Latvia, Nov. 6-10, 2006

Non-patent Document 5: R2-063225 "RACH Partitioning for Handover", 3GPP TSG RAN WG2 Meeting #56 Riga, Latvia, Nov. 6-10, 2006

DISCLOSURE OF INVENTION

Problems to be Solved by the Invention

However, as described above, even in the case of using techniques not to cause a collision to occur, considerable time is spent in performing steps from downlink synchronization and preamble (Message 1) of the random access procedure up to contention resolution (Message 4) at the time of executing handover. Particularly, in traffic with high real-time characteristics, the effect of data delay is significant.

The reason why random access is used in executing handover is that the base station measures a deviation amount in transmission from the mobile station so as to acquire uplink synchronization between the base station and mobile station. Therefore, the preamble (Message 1) and preamble response (Message 2) are always required. The handover complete message (Message 3) is used to transmit a message of handover completion, and further used to specify the mobile station with C-RNTI given from the base station. Furthermore, the message is used to check whether the transmission timing is correct. The contention resolution (Message 4) is used to check the collision, and includes meaning of a response to Message 3. Therefore, Message 3 is not required when the mobile station is specified up to Message 2, and Message 4 is not required when it is confirmed that any collision does not occur.

The present invention was made in view of such circumstances, and it is an object of the invention to provide a mobile communication system, base station apparatus and mobile station apparatus enabling the time spent at the time of handover to be shortened when the mobile station apparatus performs random access for handover.

Means for Solving the Problem (1) To attain the above-mentioned object, the present invention took measures as described below. In other words, a mobile communication system according to the invention is a mobile communication system in which a mobile station apparatus uses any signature of a beforehand determined signature group between the mobile station apparatus and a base station apparatus in random access, and is characterized in that the base station apparatus selects a signature used by the mobile station apparatus in random access performed at the time of handover, and the mobile station apparatus performs handover using the signature selected in the base station apparatus and judges the presence or absence of transmission and reception of a handover complete message and contention resolution corresponding to the type of signature selected in the base station apparatus.

Thus, the mobile station apparatus judges the presence or absence of transmission and reception of a handover complete message and contention resolution corresponding to the type of signature selected in the base station apparatus, and therefore, corresponding to the type of signature, it is possible to reduce the time required for transmission and reception of these messages when the messages are not necessary. It is thereby possible to shorten the time spent at the time of handover.

(2) In the mobile communication system according to the invention, the base station apparatus is characterized by determining the presence or absence of transmission and reception of a handover complete message and contention resolution corresponding to whether or not the signature selected in the base station apparatus is a signature for handover.

Thus, the presence or absence of transmission and reception of a handover complete message and contention resolution is determined corresponding to whether or not the signature selected in the base station apparatus is a signature for handover, and therefore, it is possible to shorten the time spent at the time of handover while coping with the collision between mobile station apparatuses when a large number of handovers occur at the same time.

(3) Particularly, in the mobile communication system of the invention, the base station apparatus is characterized by determining that transmission and reception of a handover complete message and contention resolution is not performed when the signature selected in the base station apparatus is a signature for handover, while determining that transmission and reception of a handover complete message and contention resolution is performed when the signature selected in the base station apparatus is not a signature for handover.

Thus, it is determined that transmission and reception of a handover complete message, etc. is not performed when the signature selected in the base station apparatus is a signature for handover, and that transmission and reception of a handover complete message and contention resolution is performed when the signature selected in the base station apparatus is not a signature for handover, and therefore, it is possible to shorten the time spent at the time of handover while coping with the collision between mobile station apparatuses when a large number of handovers occur at the same time.

(4) Further, in the mobile communication system of the invention, the base station apparatus is characterized by including a flag indicative of whether or not to perform transmission and reception of a handover complete message and contention resolution in a massage to be transmitted to the mobile station apparatus.

Thus, a flag indicative of whether or not to perform transmission and reception of a handover complete message and contention resolution is included in a massage to be transmitted to the mobile station apparatus, and the mobile station apparatus is thereby capable of judging whether or not to perform transmission and reception of a handover complete message and contention resolution easily based on the flag.

(5) Further, in the mobile communication system of the invention, the base station apparatus is characterized by determining whether or not to select a signature for handover as a signature to select corresponding to communication conditions with the mobile station apparatus.

Thus, the base station apparatus determines whether or not to select a signature for handover as a signature to select corresponding to communication conditions with the mobile station apparatus, and therefore, in consideration of communication conditions with the mobile station apparatus, it is possible to determine whether or not to perform transmission and reception of a handover complete message and contention resolution.

(6) Further, in the mobile communication system of the invention, the base station apparatus is characterized by determining whether or not to select a signature for handover as a signature to select corresponding to Qos of traffic in the mobile station apparatus.

Thus, the base station apparatus determines whether or not to select a signature for handover as a signature to select corresponding to Qos of traffic in the mobile station apparatus, and therefore, for example, it is possible to shorten the handover time to maintain real-time characteristics for a mobile station apparatus that transmits and receives data with high real-time characteristics. Meanwhile, for a mobile station apparatus that transmits and receives data with low real-time characteristics, it is possible to perform conventional stable handover.

(7) A base station apparatus of the invention is a base station apparatus connected to a mobile station apparatus using any signature of a beforehand determined signature group in random access, and characterized by having a signature managing section that selects a signature used by the mobile station apparatus in random access performed at the time of handover, and a message transmission determining section that determines whether or not to perform transmission and reception of a handover complete message and contention resolution corresponding to the type of signature selected in the signature managing section.

Thus, whether or not to perform transmission and reception of a handover complete message and contention resolution is determined corresponding to the type of signature selected in the signature managing section, and therefore, corresponding to the type of signature, it is possible to reduce the time required for transmission and reception of these messages when the messages are not necessary. It is thereby possible to shorten the time spent at the time of handover.

(8) In the base station apparatus of the invention, the message transmission determining section is characterized by determining that transmission and reception of a handover complete message and contention resolution is not performed when the signature selected in the signature managing section is a signature for handover, and that transmission and reception of a handover complete message and contention resolution is performed when the signature selected in the signature managing section is not a signature for handover.

Thus, it is determined that transmission and reception of a handover complete message, etc. is not performed when the signature selected in the signature managing section is a signature for handover, and that transmission and reception of a handover complete message and contention resolution is performed when the signature selected in the signature managing section is not a signature for handover, and therefore, it is possible to shorten the time spent at the time of handover while coping with the collision between mobile station apparatuses when a large number of handovers occur at the same time.

(9) In the base station apparatus of the invention, the message transmission determining section is characterized by including a flag indicative of whether or not to perform transmission and reception of a handover complete message and contention resolution in a massage to be transmitted to the mobile station apparatus.

Thus, a flag indicative of whether or not to perform transmission and reception of a handover complete message and contention resolution is included in a massage to be transmitted to the mobile station apparatus, and the mobile station apparatus is thereby capable of judging whether or not to perform transmission and reception of a handover complete message and contention resolution easily based on the flag.

(10) Further, in the base station apparatus of the invention, the signature managing section is characterized by determining whether or not to select a signature for handover as a signature to select corresponding to communication conditions with the mobile station apparatus.

Thus, the signature managing section determines whether or not to select a signature for handover as a signature to select corresponding to communication conditions with the mobile station apparatus, and therefore, in consideration of communication conditions with the mobile station apparatus, it is possible to determine whether or not to perform transmission and reception of a handover complete message and contention resolution.

(11) In the base station apparatus of the invention, the signature managing section is characterized by determining whether or not to select a signature for handover as a signature to select corresponding to Qos of traffic in the mobile station apparatus.

Thus, the signature managing section determines whether or not to select a signature for handover as a signature to select corresponding to Qos of traffic in the mobile station apparatus, and therefore, for example, it is possible to shorten the handover time to maintain real-time characteristics for a mobile station apparatus that transmits and receives data with high real-time characteristics. Meanwhile, for a mobile station apparatus that transmits and receives data with low real-time characteristics, it is possible to perform conventional stable handover.

(12) A mobile station apparatus of the invention is a mobile station apparatus using any signature of a beforehand determined signature group between the mobile station apparatus and a base station apparatus in random access, and is characterized by having a receiving section that receives a message including a flag indicative of whether or not to perform transmission and reception of a handover complete message and contention resolution from the base station apparatus, and a judging section that judges whether or not to perform transmission and reception of a handover complete message and contention resolution corresponding to content of the flag.

Thus, the judging section judges whether or not to perform transmission and reception of a handover complete message and contention resolution corresponding to the content of a flag included in the message received from base station apparatus, and it is thereby possible to reduce the time required for transmission and reception of these messages when the messages are not necessary. It is thus possible to shorten the time spent at the time of handover.

Advantageous Effect of the Invention

According to the invention, the mobile station apparatus judges the presence or absence of transmission and reception of a handover complete message and contention resolution corresponding to the type of signature selected in the base station apparatus, and therefore, corresponding to the type of signature, it is possible to reduce the time required for transmission and reception of these messages when the messages are not necessary. It is thereby possible to shorten the time spent at the time of handover.

BRIEF DESCRIPTION OF DRAWINGS

FIG. 26 is a sequence chart to explain an example of a conventional procedure of random access at the time of executing handover.

DESCRIPTION OF SYMBOLS

Figure 1:
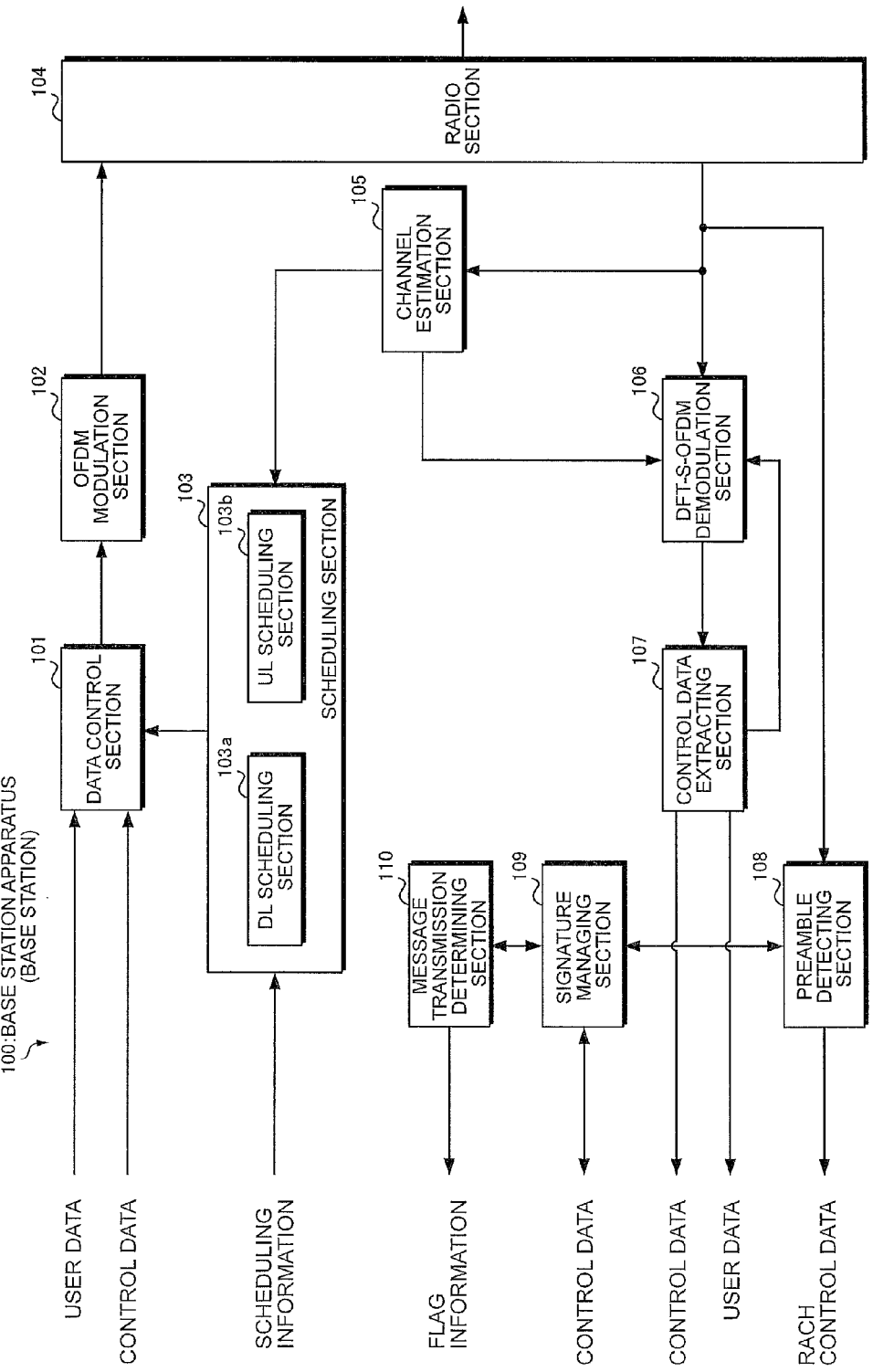
FIG. 1 is a block diagram showing an example of a configuration of a base station apparatus included in a communication system according to Embodiment 1 of the invention.

100 Base station apparatus (Base station)
101 Data control section
102 OFDM modulation section
103 Scheduling section
104 Radio section
105 Channel estimation section
106 DFT-S-OFDM demodulation section
107 Control data extracting section
108, 1201, 1701 Preamble detecting section
109, 1702 Signature managing section
110, 701, 1202, 1703 Message transmission determining section
200 Mobile station apparatus (Mobile station)
201 Data control section
202 DFT-S-OFDM modulation section
203 Scheduling section
204 Signature selecting section
205 Preamble generating section
206 Synchronization correcting section
207 Radio section
208 Channel estimation section
209 OFDM demodulation section
210 Control data extracting section

BEST MODE FOR CARRYING OUT THE INVENTION

Embodiments of the invention will specifically be described below with reference to accompanying drawings.
(Embodiment 1)

In a mobile communication system (hereinafter, referred to as a "communication system" as appropriate) according to Embodiment 1 of the invention, a base station apparatus (hereinafter, referred to as a "base station" as appropriate) performs selection of signatures that has conventionally been performed in a mobile station apparatus (hereinafter, referred to as a "mobile station" as appropriate). Then, by detecting a preamble from a mobile station, the base station specifies the mobile station that performs handover, while calculating synchronization deviation information, and notifies the mobile station of the synchronization deviation information.

Thus, in the communication system, since the base station selects a signature for handover of a mobile station, while specifying the mobile station that performs handover corresponding to a preamble from the mobile station, there is no need of a handover complete message (Message 3). Further, since the base station selects a signature for handover of a mobile station, the collision does not occur. Therefore, it is possible to eliminate the processing after the handover complete message (Message 3), and it is thereby possible to shorten the time spent at the time of handover.

However, in the communication system, when a large number of handovers occur at the same time, as a result of lack of signatures for handover, the need arises for selecting a signature for use except handover. In this case, the collision may occur with another mobile station that performs random access using the signature for use except handover. In this case, it is necessary to perform the processing after the handover complete message (Message 3) to cope with such a collision.

Therefore, in the communication system, the presence or absence of transmission and reception of a handover complete message (Message 3) and contention resolution (Message 4) is determined corresponding to whether or not a signature selected in the base station is a signature for handover. By this means, when these messages are not necessary, it is possible to reduce the time required for transmission and reception of the messages. Therefore, it is possible to shorten the time spent at the time of handover while coping with the collision between mobile stations when a large number of handovers occur at the same time.

In addition, in the following description, the signature for handover is a signature which is designated by the base station individually and thereby aims to prevent a collision from occurring between mobile stations. Further, ordinary signatures are signatures which can be selected by mobile stations and have the possibility that the collision occurs between mobile stations.

Figure 2:
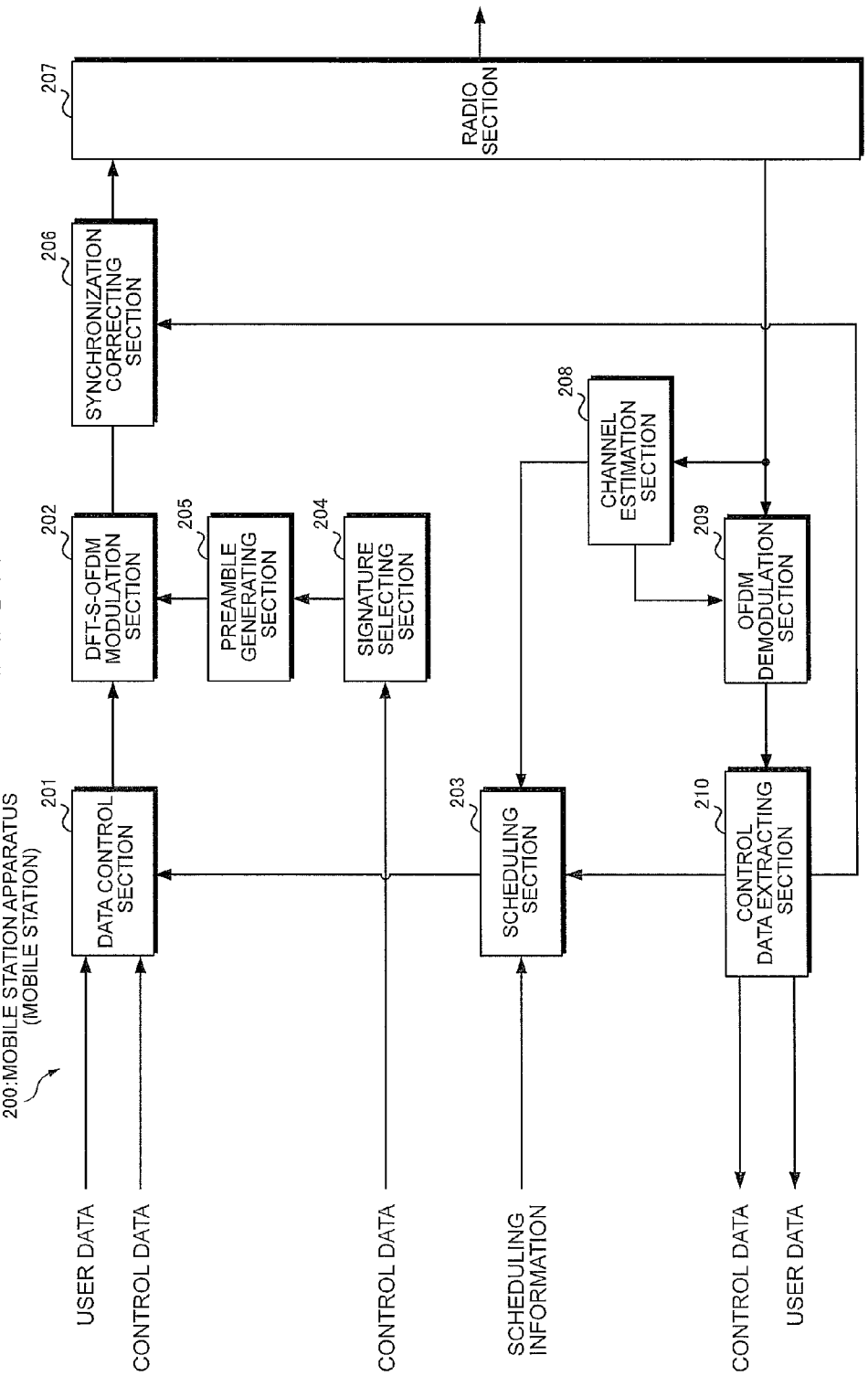
FIG. 2 is a block diagram showing an example of a configuration of a mobile station apparatus included in the communication system according to Embodiment 1.

Described below are configurations of the base station and mobile station included in the communication system according to this Embodiment. FIG. 1 is a block diagram showing an example of a configuration of the base station included in the communication system according to Embodiment 1. FIG. 2 is a block diagram showing an example of a configuration of the mobile station included in a communication system according to Embodiment 1.

As shown in FIG. 1, the base station 100 is comprised of a data control section 101, OFDM modulation section 102, scheduling section 103, radio section 104, channel estimation section 105, DFT-Spread-OFDM demodulation section (DFT-S-OFDM demodulation section) 106, control data extracting section 107, preamble detecting section 108, signature managing section 109 and message transmission determining section 110.

The data control section 101 receives inputs of control data and user data, and corresponding to directions from the scheduling section 103, performs mapping of the control data on a downlink shared control channel, downlink synchronized channel, downlink pilot channel and downlink shared control signaling channel, while further performing mapping of transmission data (user data) to each mobile station on a shared data channel.

The OFDM modulation section 102 performs data modulation, serial/parallel transform of an input signal, IFFT (Inverse Fast Fourier Transform), CP (Cyclic Prefix) insertion, filtering and the like, and thus performs OFDM signal processing to generate an OFDM signal.

The scheduling section 103 is comprised of a DL scheduling section 103a that performs downlink scheduling, and UL scheduling 103b that performs uplink scheduling. The DL scheduling section 103a performs scheduling to perform mapping of user data on each downlink channel from CQI information notified from the mobile station, and data information of each user notified from a higher layer. The UL scheduling section 103b performs scheduling to perform mapping of user data on each uplink channel from an uplink radio propagation path estimation result from the channel estimation section 105, and resource allocation request from the mobile station.

The radio section 104 up-converts the OFDM modulated data into a radio-frequency signal to transmit to the mobile station. Further, the radio section 104 receives uplink data from the mobile station, down-converts the data to a baseband signal, and outputs the reception data to the channel estimation section 105, DFT-S-OFDM demodulation section 106 and preamble detecting section 108.

The channel estimation section 105 estimates radio propagation path characteristics from the uplink pilot channel UPiCH, and outputs an estimation result to the DFT-S-OFDM demodulation section 106. Further, to perform uplink scheduling, the section 105 outputs the radio propagation path estimation result to the scheduling section 103. In addition, as an uplink communication system, a single-carrier system is assumed such as DFT-S-OFDM and the like, but a multicarrier system is also allowed such as the OFDM system and the like.

The DFT-S-OFDM demodulation section 106 demodulates the reception data input from the radio section 104, corresponding to the radio propagation path estimation result from the channel estimation section 105.

The control data extracting section 107 divides the reception data into user data (uplink shared data channel USDCH) and control data (uplink shared control signaling channel USCSCH). Among the divided control data, the downlink CQI information is output to the scheduling section 103, and the other control data and user data is output to the higher layer.

The preamble detecting section 108 detects a preamble, calculates a synchronization timing deviation amount, and reports the signature ID number and synchronization timing deviation amount to the higher layer. When the signature ID number is for handover, the section 108 checks whether or not the signature ID number is of a signature used by the base station 100 with the signature managing section 109. As a result of the check, when the signature is used by the base station 100, the section 108 reports the signature ID number and synchronization timing deviation amount to the higher layer. On the other hand, when the signature is not used by the base station 100, the section 108 does not report the signature ID number and synchronization timing deviation amount to the higher layer.

The signature managing section 109 selects a signature corresponding to directions from the higher layer, and notifies the higher layer of the ID number (signature ID number) of the selected signature. Further, the section 109 notifies the selected signature to the preamble detecting section 108 and message transmission determining section 110. In addition, in selecting a signature, the section 109 selects preferentially from among signatures for handover, and when all such signatures are used, selects a signature to use from among signatures for uses except handover. At this point, the signature managing section 109 confirms signature ID numbers being currently used, and selects one from among signatures except signatures being used. Further, the signature managing section 109 stores the selected signature ID number, and deletes the signature detected in the preamble detecting section 108 from the stored content.

The message transmission determining section 110 determines whether or not to perform transmission and reception of a handover complete message (Message 3) and contention resolution (Message 4) from the signature information from the signature managing section 109, and notifies the higher layer of the result as flag information.

Meanwhile, as shown in FIG. 2, the mobile station 200 is comprised of a data control section 201, DFT-S-OFDM modulation section 202, scheduling section 203, signature selecting section 204, preamble generating section 205, synchronization correcting section 206, radio section 207, channel estimation section 208, OFDM demodulation section 209 and control data extracting section 210.

The data control section 201 receives inputs of user data and control data, and corresponding to directions from the scheduling section 203, performs mapping of the data on an uplink scheduling channel.

The DFT-S-OFDM modulation section 202 modulates the data, performs DFT-S-OFDM signal processing such as DFT transform, subcarrier mapping, IFFT, CP (Cyclic Prefix) insertion, filtering and the like, and generates a DFT-Spread-OFDM signal. In addition, as an uplink communication system, a single-carrier system is assumed such as DFT-Spread OFDM and the like, but a multicarrier system is also allowed such as the OFDM system.

The scheduling section 203 performs scheduling to perform mapping of user data on each uplink channel from CQI information notified from the channel estimation section 208 described later, and scheduling information notified from the higher layer.

The signature selecting section 204 selects a signature ID number to use in random access corresponding to directions from the higher layer. As directions from the higher layer, the purpose of random access is notified. When the notified purpose is handover, the section 204 selects the signature ID number instructed from the higher layer. Meanwhile, when the notified purpose is not handover, the section 204 randomly selects a signature from among signatures for uses except handover corresponding to the purpose, and outputs the selected signature ID number to the preamble generating section 205.

The preamble generating section 205 generates a preamble using the signature ID number selected in the signature selecting section 204 to output to the DFT-S-OFDM modulation section 202.

The synchronization correcting section 206 determines transmission timing from the synchronization information input from the control data extracting section 210, and outputs data modulated to adapt to the transmission timing to the radio section 207.

The radio section 207 up-converts the modulated data into a radio-frequency signal to transmit to the base station 100. Further, the radio section 207 receives downlink data from the base station 100 to down-convert into a baseband signal, and outputs reception data to the OFDM demodulation section 209.

The channel estimation section 208 estimates radio propagation path characteristics from the downlink pilot channel, and outputs the estimation result to the OFDM demodulation section 209. Further, the section 208 converts the result into CQI information to notify the base station 100 of the radio propagation path estimation result, and outputs the CQI information to the scheduling section 203.

The OFDM demodulation section 209 demodulates the reception data input from the radio section 207, corresponding to the radio propagation path estimation result input from the channel estimation section 208.

The control data extracting section 210 divides the reception data into user data and control data. The scheduling information in the divided control data is output to the scheduling section 203, uplink synchronization information is output to the synchronization correcting section 206, and the other control data and user data is output to the higher layer. In addition, the radio section 207, OFDM demodulation section 209 and control data extracting section 210 constitute the receiving section, and the scheduling section 203 constitutes the judging section.

Figure 3:
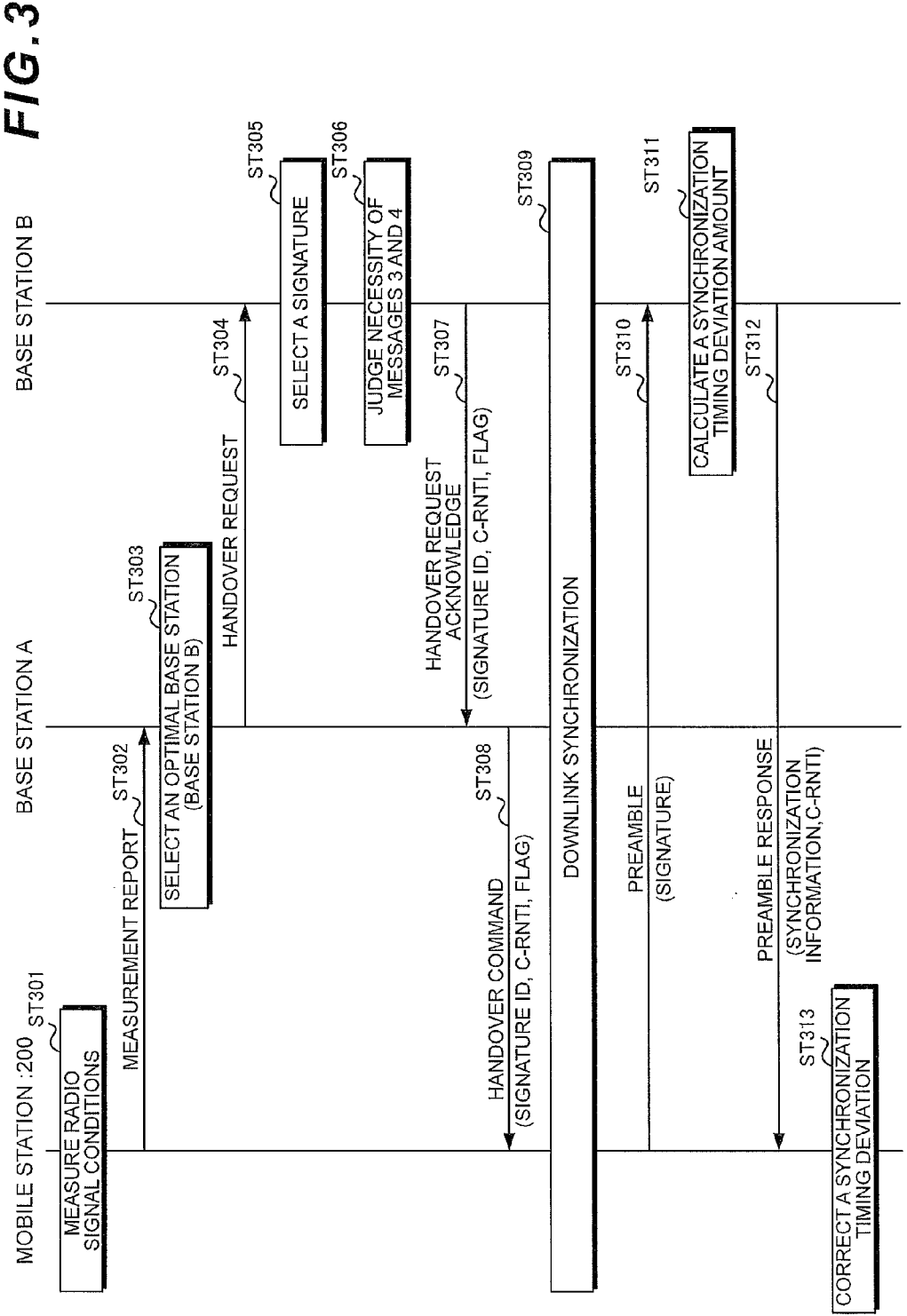
FIG. 3 is a sequence chart to explain an example of a random access procedure at the time of executing handover in the communication system according to Embodiment 1.
Figure 4:
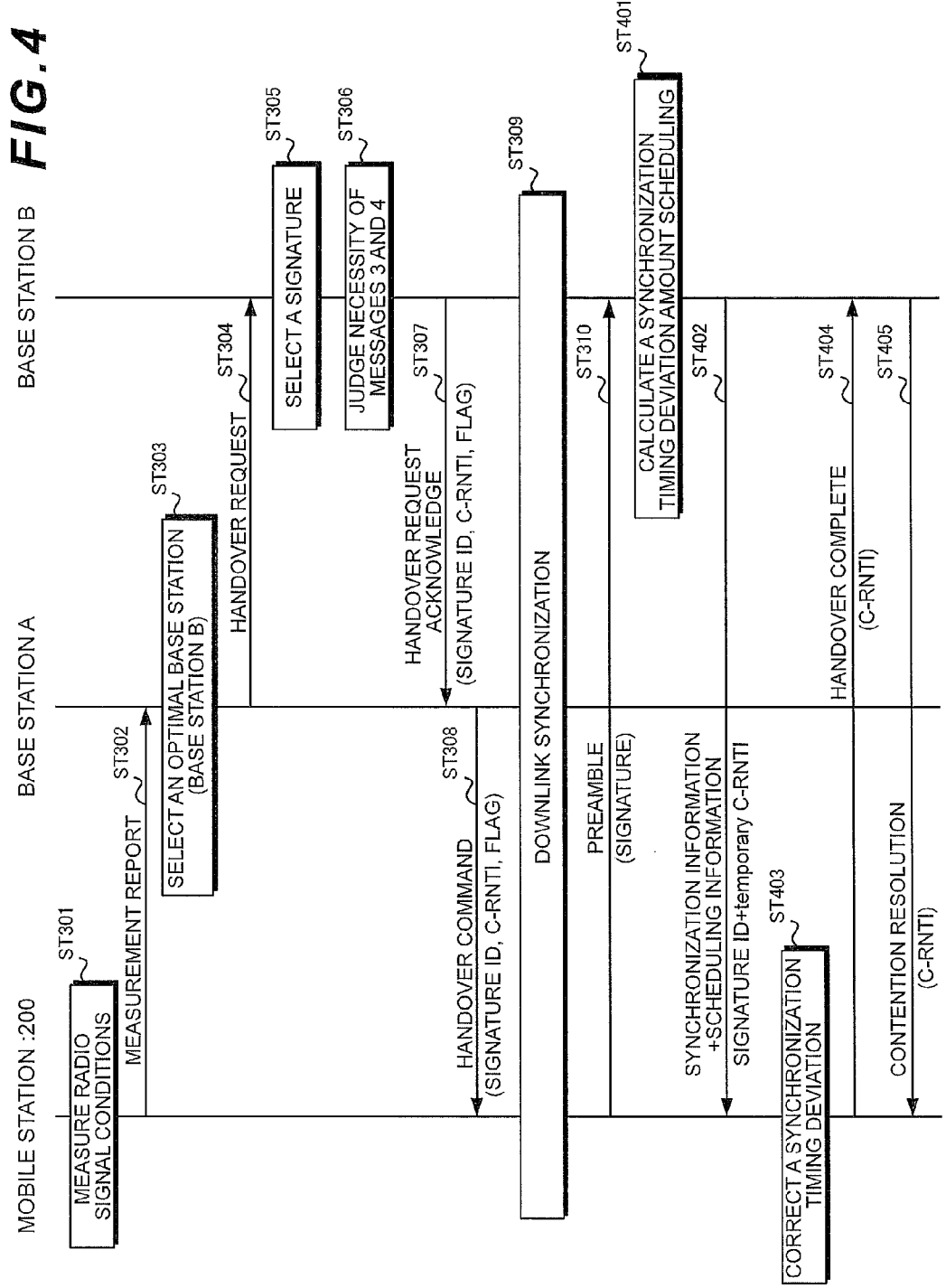
FIG. 4 is a sequence chart to explain an example of another random access procedure at the time of executing handover in the communication system according to Embodiment 1.

Described next is an example of a random access procedure at the time of executing handover in the communication system according to Embodiment 1. FIGS. 3 and 4 are sequence charts to explain an example of a random access procedure at the time of executing handover in the communication system according to Embodiment 1. FIG. 3 shows the case of not performing transmission and reception of a handover complete message (Message 3) and contention resolution (Message 4), and FIG. 4 shows the case of performing transmission and reception of these messages. In addition, it is assumed herein that the mobile station 200 is currently held by a base station 100A (hereinafter, referred to as a "base station A" as appropriate). Further, in FIG. 4, the same processing as shown in FIG. 3 is assigned the same symbol to omit descriptions thereof.

As shown in FIGS. 3 and 4, in the random access procedure at the time of executing handover in the communication system according to this Embodiment, as a preparatory stage of handover, the mobile station 200 first measures radio signal conditions of adjacent base stations (ST301). Then, the mobile station 200 transmits the measurement result (measurement report) to the base station A that is the local-base station (ST302).

Upon receiving the measurement result from the mobile station 200, the base station A selects a base station optimal as a handover destination from the measurement result (ST303). In addition, herein, as the optimal base station, a base station 100B (hereinafter, referred to as a "base station B" as appropriate) is assumed to be selected. Then, the base station A transmits a handover request message to the base station B that is a handover destination (ST304).

Upon receiving the handover request message from the base station A, the base station B selects one signature from among signatures for handover (ST305). In this case, in order to avoid the collision between mobile stations 200 to perform handover at the time of random access, the base station B selects a signature from among signatures except signatures used in the base station B. In addition, when all the signatures for handover are being used and cannot be used, the base station B selects a signature from among signatures for uses except handover.

Further, based on the signature to use, the base station B judges whether transmission and reception of a handover complete message (Message 3) and contention resolution (Message 4) is required (ST306). In addition, in this judgment, in the case of a signature for handover, since the collision does not occur, the base station B judges that transmission and reception of a handover complete message (Message 3) and contention resolution (Message 4) is not performed. Meanwhile, in the case of a signature for use except handover, since there is a possibility that the collision occurs, the base station B judges that transmission and reception of a handover complete message (Message 3) and contention resolution (Message 4) is performed.

Then, after assigning C-RNTI to the mobile station 200 to perform handover, the base station B transmits a handover request acknowledge message including the signature ID number, flag (hereinafter, referred to as a "message necessity flag" or "flag" as appropriate) indicative of whether or not Message 3 and Message 4 are required, and C-RNTI to the base station A as a response to the handover request message (ST307).

Upon receiving the handover request acknowledge message from the base station B, the base station A transmits a handover command message including the signature ID number, message necessity flag and C-RNTI to the mobile station 200 (ST308).

Upon receiving the handover command message from the base station A, the mobile station 200 checks the message necessity flag, acquires downlink synchronization with the base station B, and checks a position of the random access channel from the broadcast channel (ST309). After acquiring downlink synchronization, the mobile station 200 selects the signature ID number added to the handover command message, and transmits a preamble (random access preamble: Message 1) including the signature ID number to the base station B on the random access channel (ST310).

The base station B detects the signature from the preamble received from the mobile station 200. The processing differs corresponding to the type of signature. When the base station B confirms that the signature is a signature for handover, as shown in FIG. 3, the base station B calculates a synchronization timing deviation amount (ST311). Then, the base station B transmits a preamble response (Message 2) including the synchronization timing deviation information (synchronization information) and C-RNTI to the mobile station 200 (ST312). In addition, when there is data for the mobile station to transmit on uplink, the base station B performs uplink scheduling, and includes also the scheduling information in the preamble response (Message 2) to transmit to the mobile station 200.

Upon receiving these pieces of information from the base station B, the mobile station 200 recognizes the information as data to the mobile station 200, and corrects the synchronization timing deviation from the synchronization information (ST313). Thereafter, the mobile station 200 completes the handover.

Meanwhile, when the base station B confirms that the signature is a signature for use except handover, as shown in FIG. 4, the base station B calculates a synchronization timing deviation amount, and performs scheduling for transmitting a handover complete message (ST401). Then, the base station B transmits a preamble message (Message 2) including the synchronization information, scheduling information, signature ID number, and temporary C-RNTI to the mobile station 200 (ST402).

Upon receiving these pieces of information from the base station B, the mobile station 200 recognizes the information as data to the mobile station 200, and corrects the synchronization timing deviation from the synchronization information (ST403). Then, the mobile station 200 generates a handover complete message including C-RNTI, and transmits the handover complete message (Message 3) with resources subjected to scheduling to the base station B (ST404). In this case, since a message necessity flag is set at "0", the mobile station 200 waits for a contention resolution (Message 4).

Upon receiving the handover complete message (Message 3), the base station 100 generates a contention resolution (Message 4) to transmit to the mobile station 200 (ST405). Thereafter, the base station 100 completes the handover. Meanwhile, the mobile station 200 receives the contention resolution (Message 4) and completes the handover.

Figure 5:
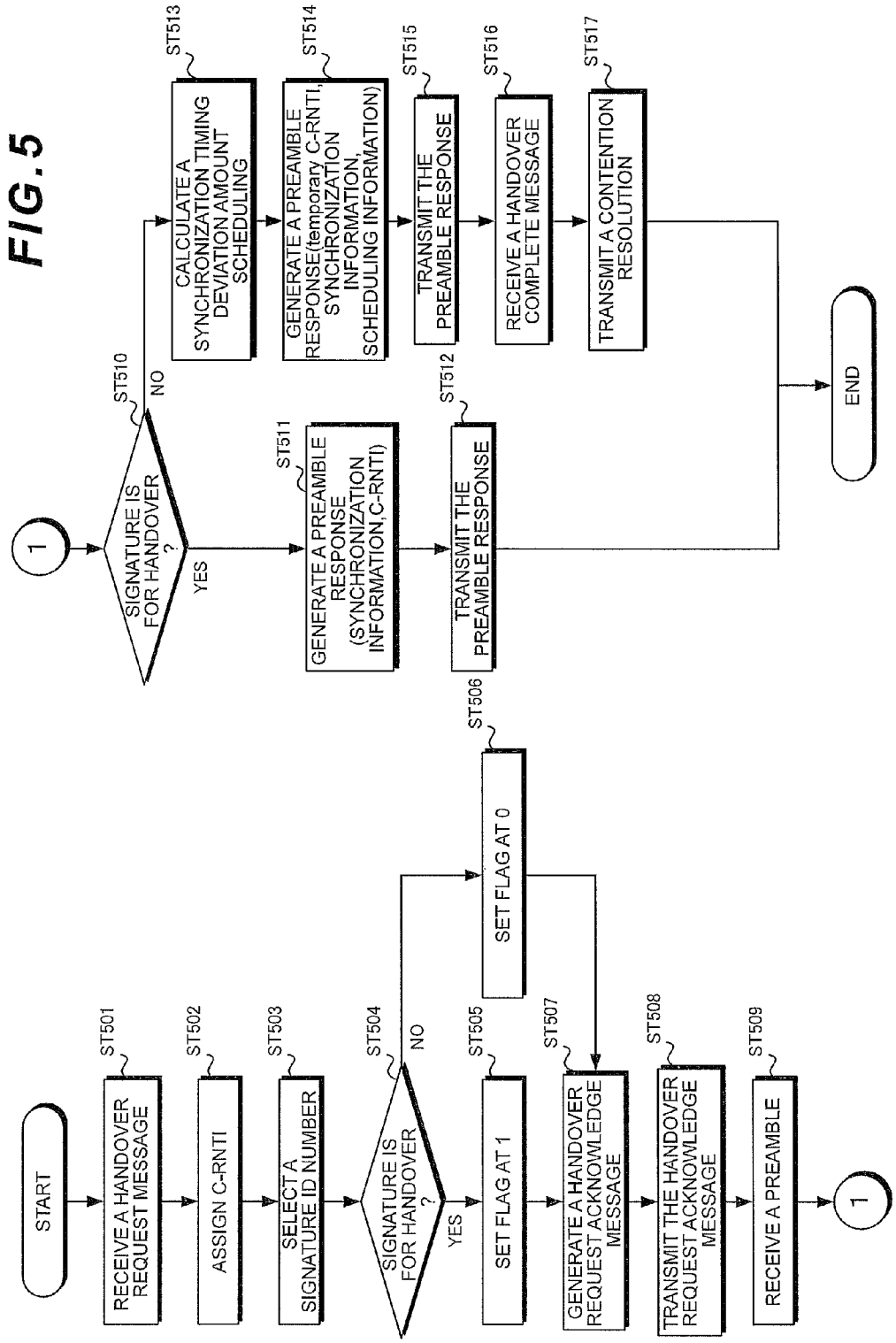
FIG. 5 is a flowchart to explain operation at the time of executing handover in the base station apparatus included in the communication system according to Embodiment 1.
Figure 6:
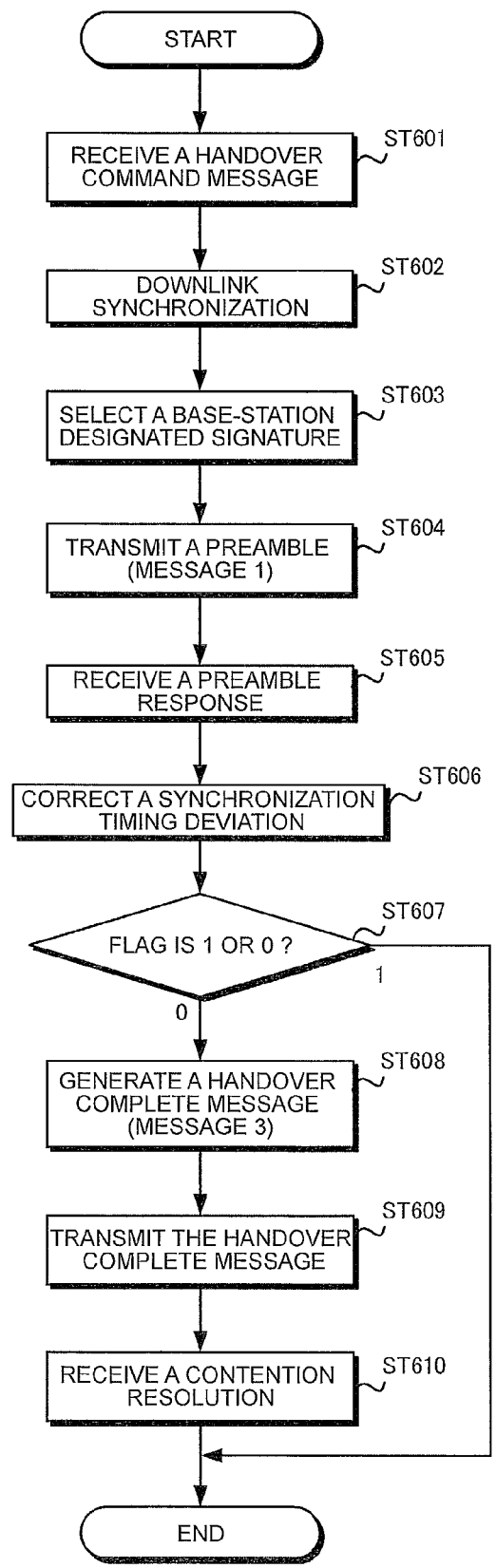
FIG. 6 is a flowchart to explain operation at the time of executing handover in the mobile station apparatus included in the communication system according to Embodiment 1.

Described herein are operations at the time of executing handover in the base station 100 and mobile station 200 included in the communication system according to Embodiment 1. FIG. 5 is a flowchart to explain the operation at the time of executing handover in the base station 100 included in the communication system according to Embodiment 1. FIG. 6 is a flowchart to explain the operation at the time of executing handover in the mobile station 200 included in the communication system according to this Embodiment. In addition, it is assumed that FIG. 5 shows the operation of the base station B (base station that is a handover destination) as shown in FIGS. 3 and 4, and that FIG. 6 shows the operation of the mobile station 200 as shown in FIGS. 3 and 4.

As shown in FIG. 5, upon receiving a handover request message from the base station A (ST501), the base station B assigns C-RNTI of the mobile station 200, while selecting a signature ID number to be used by the mobile station 200 (ST502, ST503). Then, the base station B judges whether the selected signature is a signature for handover (ST504).

When the selected signature is a signature for handover, the base station B sets a message necessity flag at "1" indicative of no need of transmission and reception of a handover complete message (Message 3) and contention resolution (Message 4) (ST505). Meanwhile, when the signature is not a signature for handover, the base station B sets a message necessity flag at "0" indicative of need of transmission and reception of a handover complete message (Message 3) and contention resolution (Message 4) (ST506).

Then, the base station B generates a handover request acknowledge message including the signature ID number, C-RNTI and message necessity flag as a response to the handover request message (ST507), and transmits this handover request acknowledge message to the base station A (ST508).

After transmitting the handover request acknowledge message, the base station B waits for a preamble (Message 1) to be transmitted from the mobile station 200. Then, upon receiving a preamble transmitted from the mobile station 200 (ST509), the base station B judges whether a signature included in the preamble is a signature for handover (ST510).

Herein, when the signature is a signature for handover, the base station B calculates a synchronization timing deviation amount, and generates a preamble response (Message 2) including the synchronization information and C-RNTI (ST511). Then, the base station B transmits this preamble response to the mobile station 200 (ST512).

Meanwhile, when the signature is not a signature for handover in ST502, the base station B calculates a synchronization timing deviation amount, while performing scheduling for transmitting a handover complete message (Message 3) (ST513). Then, the base station B generates a preamble response (Message 2) including temporary C-RNTI, the synchronization information and scheduling information (ST514). Then, the base station B transmits this preamble response to the mobile station 200 (ST515).

After transmitting the preamble response, the base station B waits for a handover complete message (Message 3) to be transmitted from the mobile station 200. Then, upon receiving a handover complete message transmitted from the mobile station 200 (ST516), the base station B transmits a contention resolution (Message 4) including C-RNTI to the mobile station 200 (ST517). In this way, a series of operation at the time of executing handover is finished in the base station 100.

In addition, with respect to the judgment and setting (ST504~ST506) of the message necessity flag made in the base station, instead of performing in the base station, the mobile station may make a necessity judgment on transmission and reception of a handover complete message (Message 3) and contention resolution (Message 4) by determining whether a signature included in a notified handover request acknowledge message is a signature for handover or ordinary signature.

Meanwhile, as shown in FIG. 6, upon receiving a handover command message from the base station A (ST601), the mobile station 200 acquires downlink synchronization with the base station B (ST602). After acquiring downlink synchronization, the mobile station 200 selects a signature of the signature ID number included in the handover command message (ST603). In other words, the mobile station 200 selects a signature designated by the base station B. Then, the mobile station 200 transmits a preamble (Message 1) including the selected signature to the base station B (ST604).

After transmitting the preamble, the mobile station 200 waits for a preamble response (Message 2) to be transmitted from the base station B. Then, upon receiving a preamble response transmitted from the base station B (ST605), the mobile station 200 corrects a synchronization timing deviation (ST606), and judges whether a message necessity flag included in the handover command message is "1" or "0" (ST607).

Herein, when the message necessity flag is "1", the mobile station 200 finishes the processing without any other processing. Meanwhile, when the message necessity flag is "0", the mobile station 200 generates a handover complete message (Message 3) including C-RNTI (ST608), and transmits the handover complete message (Message 3) (ST609). When the handover complete message is transmitted, the base station B transmits a contention resolution (Message 4), and the mobile station 200 receives the contention resolution (ST610). In this way, a series of operation at the time of executing handover is finished in the mobile station 200.

Thus, in the communication system according to Embodiment 1, the presence or absence of transmission and reception of a handover complete message (Message 3) and contention resolution (Message 4) is determined corresponding to whether or not the signature selected in the base station 100 is a signature for handover. By this means, it is possible to reduce the time required for transmission and reception of these messages when the messages are not necessary, and it is thereby possible to shorten the time spent at the time of handover while coping with the collision between mobile stations when a large number of handovers occur at the same time.

Particularly, in the communication system according to Embodiment 1, a message to transmit to the mobile station 200 includes a message necessity flag indicative of whether or not to perform transmission and reception of a handover complete message (Message 3) and contention resolution (Message 4), and the mobile station 200 is thereby capable of judging whether or not to perform transmission and reception of a handover complete message (Message 3) and contention resolution (Message 4) easily based on the message necessity flag.

(Embodiment 2)

In the communication system according to Embodiment 1, the presence or absence of transmission and reception of a handover complete message (Message 3) and contention resolution (Message 4) is determined corresponding to whether or not the signature selected in the base station 100 is a signature for handover. In a communication system according to Embodiment 2, the presence or absence of transmission and reception of a handover complete message (Message 3) and contention resolution (Message 4) is determined in consideration of Qos of traffic in the mobile station 200 to perform handover, and in this respect, the communication system differs from the communication system according to Embodiment 1.

Figure 7:
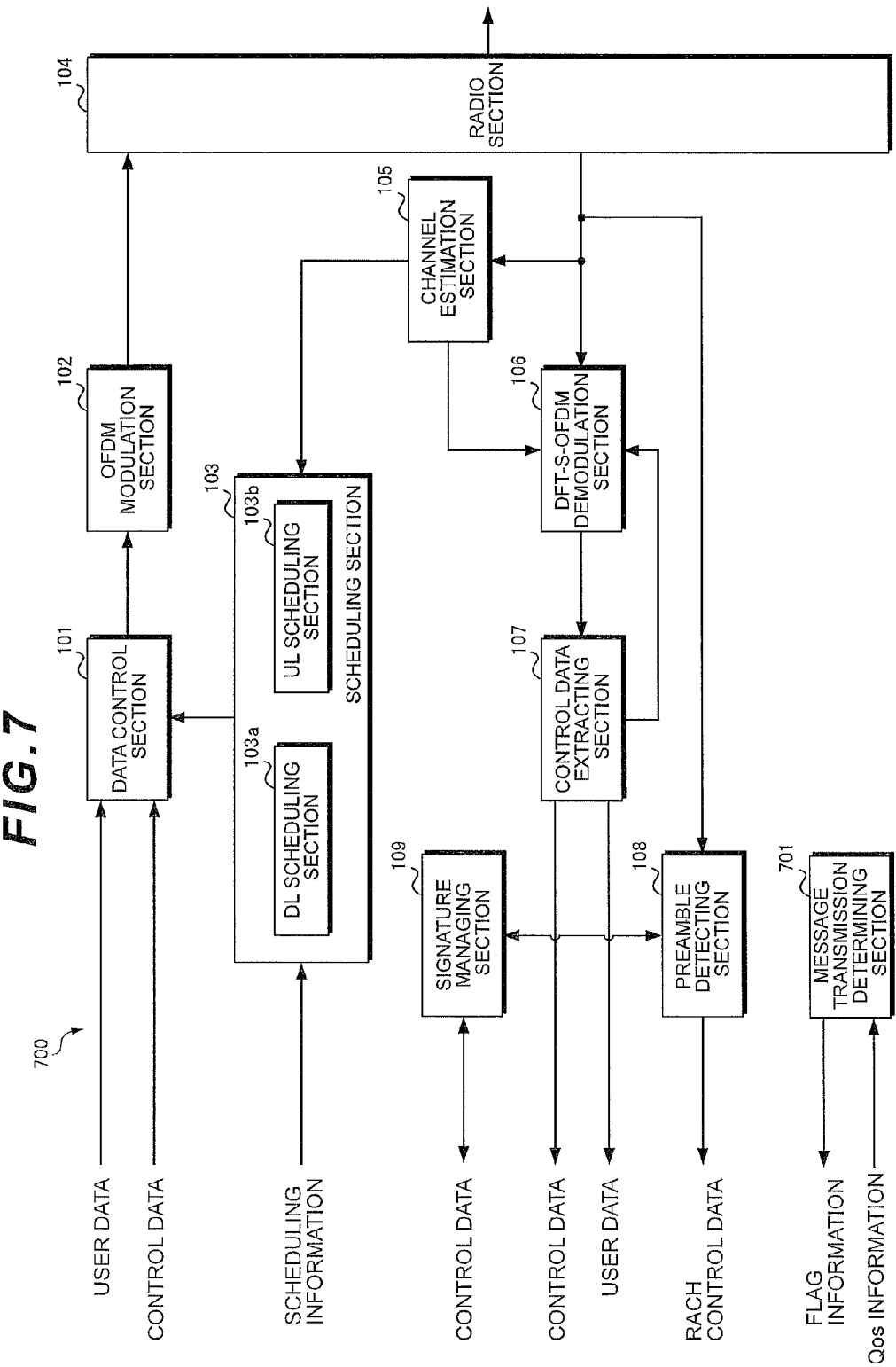
FIG. 7 is a block diagram showing an example of a configuration of a base station apparatus included in a communication system according to Embodiment 2 of the invention.

Described below are configurations of a base station and mobile station included in the communication system according to Embodiment 2. FIG. 7 is a block diagram showing an example of a configuration of the base station 700 included in the communication system according to Embodiment 2. In addition, in the base station 700 as shown in FIG. 7, the same components as in FIG. 1 are assigned the same symbols to omit descriptions thereof. Further, the mobile station included in the communication system according to Embodiment 2 has the same configuration as in the mobile station 200 according to Embodiment 1 shown in FIG. 2, and descriptions thereof are omitted.

The base station 700 as shown in FIG. 7 has a message transmission determining section 701, and in this respect, differs from the base station 100 according to Embodiment 1. In the base station 700 according to Embodiment 2, the message transmission determining section 701 determines whether or not to perform transmission and reception of a handover complete message (Message 3) and contention resolution (Message 4) from the Qos information of the mobile station 200 to perform handover from the higher layer, and notifies the higher layer of the result as flag information.

Figure 8:
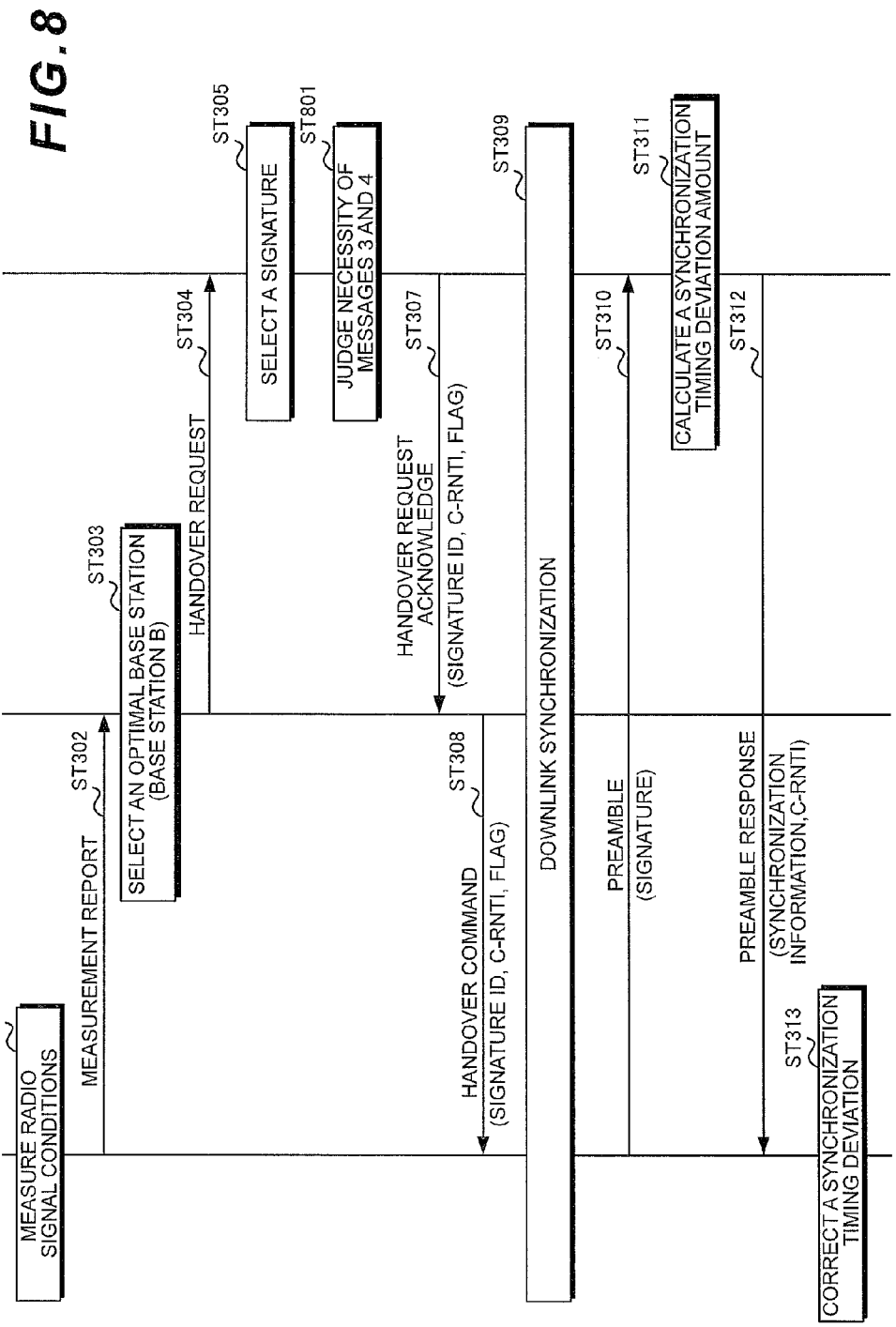
FIG. 8 is a sequence chart to explain an example of a random access procedure at the time of executing handover in the communication system according to Embodiment 2.
Figure 9:
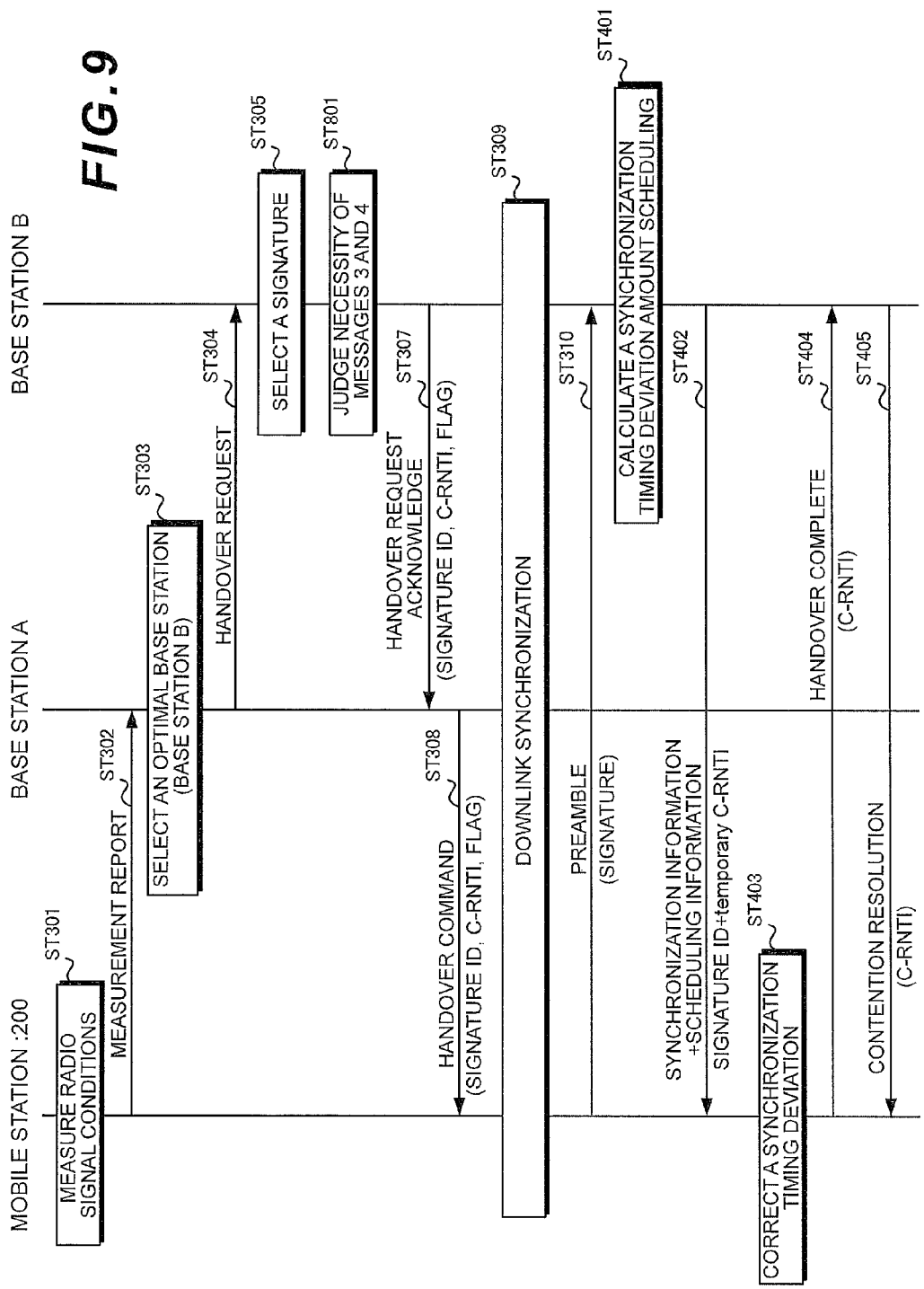
FIG. 9 is a sequence chart to explain an example of another random access procedure at the time of executing handover in the communication system according to Embodiment 2.

Described next is an example of a random access procedure at the time of executing handover in the communication system according to Embodiment 2. FIGS. 8 and 9 are sequence charts to explain an example of a random access procedure at the time of executing handover in the communication system according to Embodiment 2. FIG. 8 shows the case of not performing transmission and reception of a handover complete message (Message 3) and contention resolution (Message 4), and FIG. 9 shows the case of performing transmission and reception of these messages. In addition, it is assumed herein that the mobile station 200 is currently held by the base station 700A (hereinafter, referred to as a "base station A" as appropriate). Further, in FIGS. 8 and 9, the same processing as shown in FIGS. 3 and 4 is assigned the same symbol to omit descriptions thereof.

The random access procedure at the time of executing handover in the communication system according to Embodiment 2 differs from the procedure in the communication system according to Embodiment 1 principally in the processing for judging whether or not to perform transmission and reception of a handover complete message (Message 3) and contention resolution (Message 4).

In the communication system according to Embodiment 2, whether or not to perform transmission and reception of a handover complete message (Message 3) and contention resolution (Message 4) is judged from the Qos information of traffic of the mobile station 200 to perform handover (ST801). In addition, in this judgment, it is judged that transmission and reception of a handover complete message (Message 3) and contention resolution (Message 4) is not performed in traffic with high real-time characteristics in consideration of the real-time characteristics, and that transmission and reception of a handover complete message (Message 3) and contention resolution (Message 4) is performed in traffic with low real-time characteristics to guarantee stability of communication.

Further, in the communication system according to Embodiment 1, the processing is varied corresponding to the type of signature included in a preamble transmitted from the mobile station 200. In contrast thereto, in the communication system according to Embodiment 2, the processing is varied corresponding to necessity of transmission and reception of a handover complete message (Message 3) and contention resolution (Message 4) judged in ST801, and in this respect, the communication system differs from the communication system according to Embodiment 1.

In other words, when the message necessity flag indicates "1", as shown in FIG. 8, a handover complete message (Message 3) and contention resolution (Message 4) are neither transmitted nor received. Meanwhile, when the message necessity flag indicates "0", as shown in FIG. 9, a handover complete message (Message 3) and contention resolution (Message 4) are transmitted and received.

Figure 10:
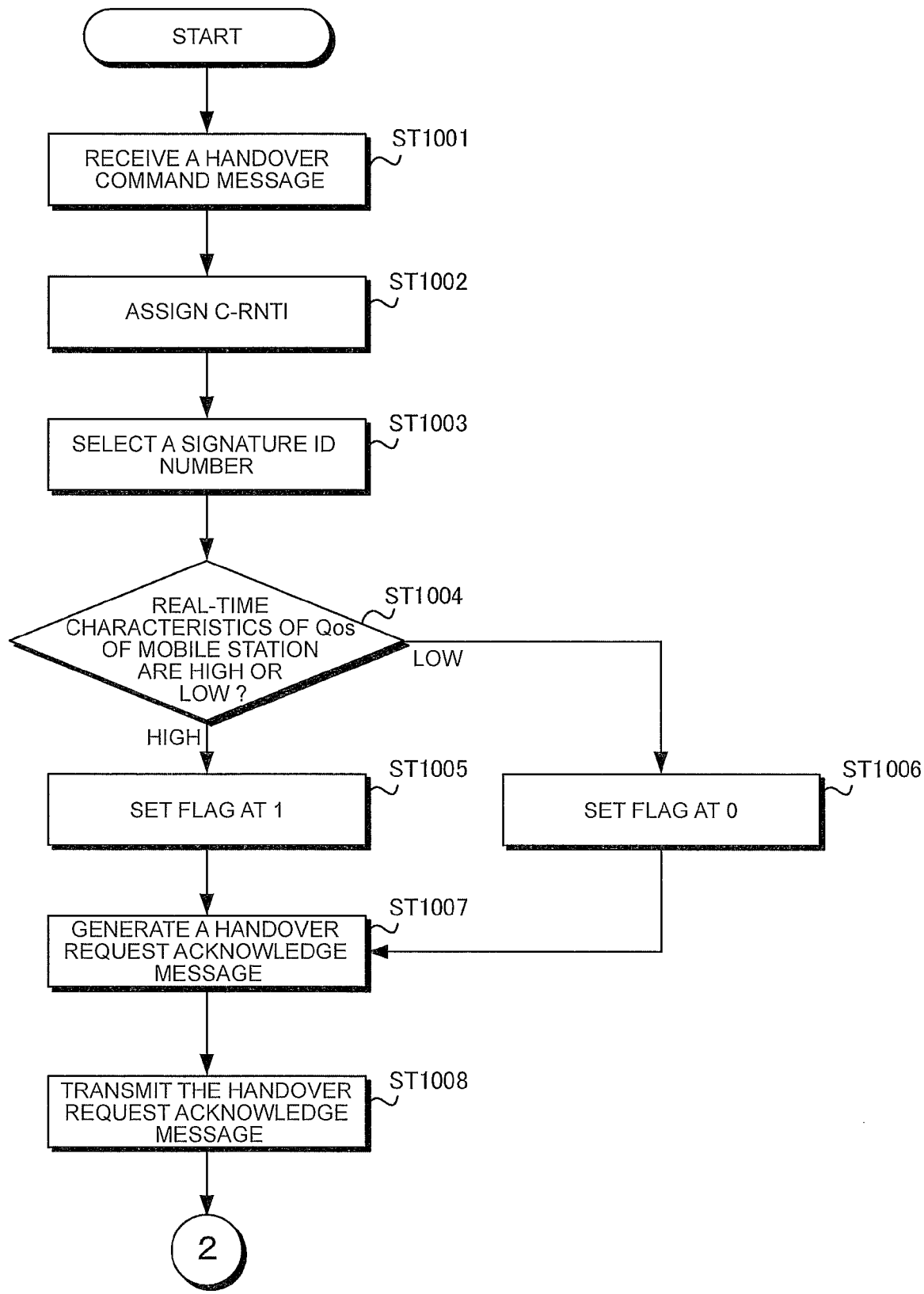
FIG. 10 is a flowchart to explain operation at the time of executing handover in the base station apparatus included in the communication system according to Embodiment 2.
Figure 11:
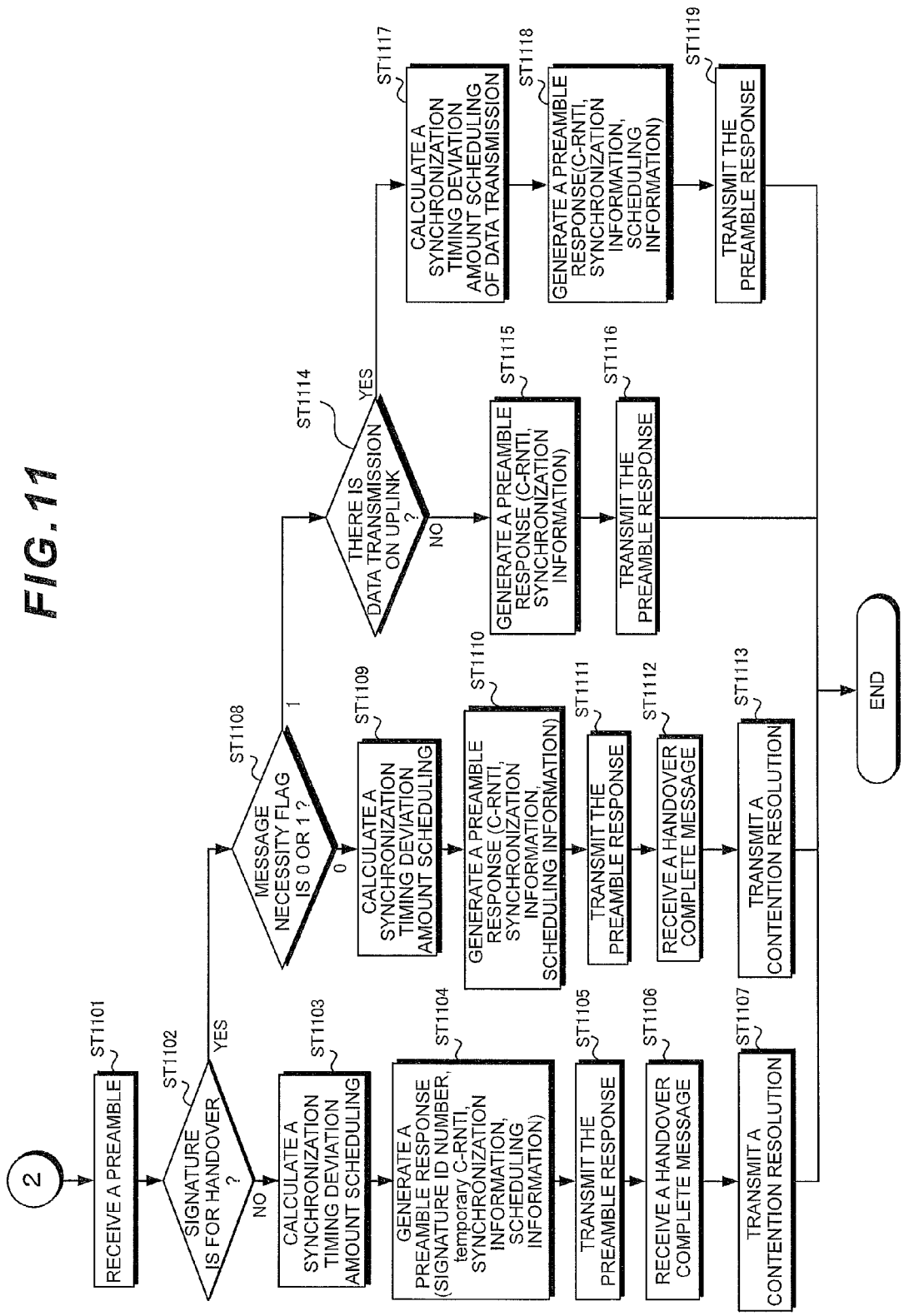
FIG. 11 is another flowchart to explain operation at the time of executing handover in the base station apparatus included in the communication system according to Embodiment 2.

Described herein is the operation at the time of executing handover in the base station 700 included in the communication system according to Embodiment 2. FIGS. 10 and 11 are flowcharts to explain the operation at the time of executing handover in the base station 700 included in the communication system according to Embodiment 2. In addition, it is assumed that FIGS. 10 and 11 show the operation of the base station B (base station that is a handover destination) as shown in FIGS. 8 and 9. Meanwhile, the operation at the time of executing handover in the mobile station 200 is the same as the operation as shown in FIG. 6, and descriptions thereof are omitted.

As shown in FIG. 10, upon receiving a handover request message from the base station A (ST1001), the base station B assigns C-RNTI of the mobile station 200, while selecting a signature ID number to be used by the mobile station 200 (ST1002, ST1003). Then, the base station B judges the Qos information of the mobile station 200 to perform handover (ST1004). More specifically, the base station B judges whether the mobile station 200 to perform handover transmits and receives data with high real-time characteristics or transmits and receives data with low real-time characteristics.

When the mobile station 200 transmits and receives data with high real-time characteristics, the base station B sets a message necessity flag at "1" indicative of no need of transmission and reception of a handover complete message (Message 3) and contention resolution (Message 4) (ST1005). Meanwhile, when the mobile station 200 transmits and receives data with low real-time characteristics, the base station B sets a message necessity flag at "0" indicative of need of transmission and reception of a handover complete message (Message 3) and contention resolution (Message 4) (ST1006).

Then, the base station B generates a handover request acknowledge message including the signature ID number, C-RNTI and message necessity flag as a response to the handover request message (ST1007), and transmits this handover request acknowledge message to the base station A (ST1008).

After transmitting the handover request acknowledge message, the base station B waits for a preamble (Message 1) to be transmitted from the mobile station 200. Then, as shown in FIG. 11, upon receiving a preamble transmitted from the mobile station 200 (ST1101), the base. station B judges whether a signature included in the preamble is a signature for handover (ST1102).

Herein, when the signature is not a signature for handover, the base station B calculates a synchronization timing deviation amount, while performing scheduling for transmitting a handover complete message (Message 3) (ST1103). Then, the base station B generates a preamble response (Message 2) including temporary C-RNTI, the synchronization information and scheduling information (ST1104). Then, the base station B transmits this preamble response to the mobile station 200 (ST1105).

After transmitting the preamble response, the base station B waits for a handover complete message (Message 3) to be transmitted from the mobile station 200. Then, upon receiving a handover complete message transmitted from the mobile station 200 (ST1106), the base station B transmits a contention resolution (Message 4) including C-RNTI to the mobile station 200 (ST1107).

Meanwhile, in ST1102, when the signature is a signature for handover, the base station B judges the flag on whether or not to perform transmission and reception of a handover complete message (Message 3) and contention resolution (Message 4) i.e. judges whether the message necessity flag is "0" or "1" (ST1108). When the message necessity flag is "1", the base station B calculates a synchronization timing deviation amount, while performing scheduling for transmitting a handover complete message (Message 3) (ST1109). Then, the base station B generates a preamble response (Message 2) including temporary C-RNTI, the synchronization information and scheduling information (ST1110). Then, the base station B transmits this preamble response to the mobile station 200 (ST1111).

After transmitting the preamble response, the base station B waits for a handover complete message (Message 3) to be transmitted from the mobile station 200. Then, upon receiving a handover complete message transmitted from the mobile station 200 (ST1112), the base station B transmits a contention resolution (Message 4) including C-RNTI to the mobile station 200 (ST1113).

Meanwhile, in ST1108, when the message necessity flag is "1", the base station B judges whether uplink data transmission to the base station 700 is performed in the mobile station 200 (ST1114). Herein, when uplink data transmission is not performed, the base station B calculates a synchronization timing deviation amount, and generates a preamble response (Message 2) including the synchronization information and C-RNTI (ST1115). Then, the base station B transmits this preamble response to the mobile station 200 (ST1116).

Meanwhile, when uplink data transmission is performed, the base station B calculates a synchronization timing deviation amount, and performs scheduling for transmitting data (ST1117). Then, the base station B generates a preamble response (Message 2) including C-RNTI, the synchronization information and scheduling information (ST1118). Then, the base station B transmits this preamble response to the mobile station 200 (ST1119). In this way, a series of operation at the time of executing handover is finished in the base station 700.

Thus, in the communication system according to Embodiment 2, whether or not to perform transmission and reception of a handover complete message (Message 3) and contention resolution (Message 4) is judged using Qos information, and therefore, it is possible to shorten the handover time to maintain real-time characteristics for the mobile station 200 that transmits and receives data with high real-time characteristics. Meanwhile, for the mobile station 200 that transmits and receives data with low real-time characteristics, it is possible to perform conventional stable handover.

(Embodiment 3)

In the communication system according to Embodiment 1, the presence or absence of transmission and reception of a handover complete message (Message 3) and contention resolution (Message 4) is determined corresponding to whether or not the signature selected in the base station 100 is a signature for handover. In a communication system according to Embodiment 3, a handover-destination base station judges reception conditions of a preamble in receiving the preamble, and determines the presence or absence of transmission and reception of a handover complete message (Message 3) and contention resolution (Message 4), and in this respect, the communication system differs from the communication system according to Embodiment 1.

Figure 12:
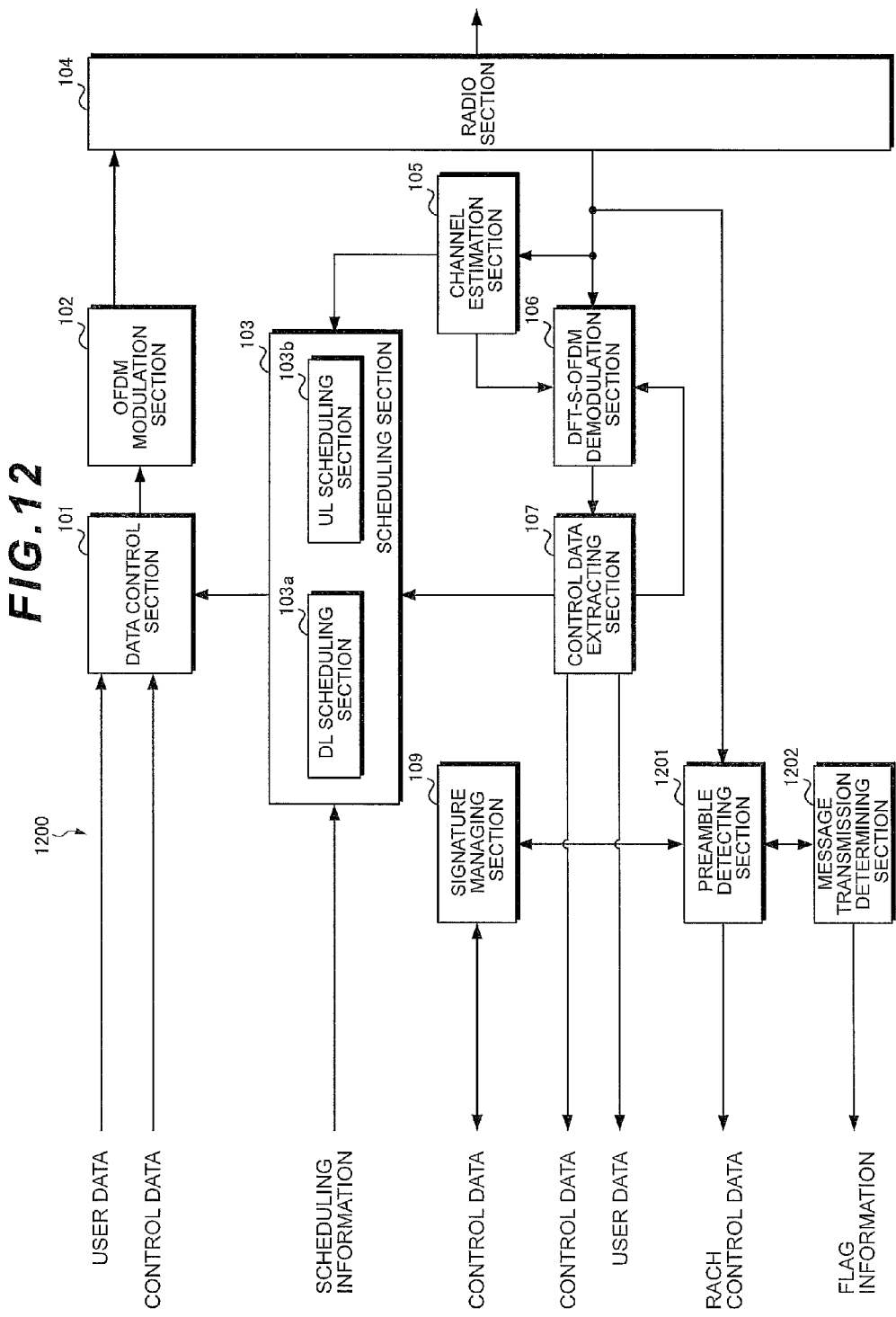
FIG. 12 is a block diagram showing an example of a configuration of a base station apparatus included in a communication system according to Embodiment 3 of the invention.

Described below are configurations of a base station and mobile station included in the communication system according to Embodiment 3. FIG. 12 is a block diagram showing an example of a configuration of the base station 1200 included in the communication system according to Embodiment 3. In addition, in the base station 1200 as shown in FIG. 12, the same components as in FIG. 1 are assigned the same symbols to omit descriptions thereof. Further, the mobile station included in the communication system according to Embodiment 3 has the same configuration as in the mobile station 200 according to Embodiment 1 shown in FIG. 2, and descriptions thereof are omitted.

The base station 1200 as shown in FIG. 12 has a preamble detecting section 1201 and message transmission determining section 1202, and in this respect, differs from the base station 100 according to Embodiment 1. In the base station 1200 according to Embodiment 3, the preamble detecting section 1201 detects a preamble from the mobile station 200, calculates a synchronization timing deviation amount, and reports a signature ID number and synchronization timing deviation amount to the higher layer. Herein, when the signature ID number is for handover, the preamble detecting section 1201 checks whether or not the signature ID number is of a signature used by the base station 1200 with the signature managing section 109. As a result of the check, when the signature is used by the base station 1200, the preamble detecting section 1201 reports the signature ID number and synchronization timing deviation amount to the higher layer. Meanwhile, when the signature is not used by the base station 1200, the preamble detecting section 1201 does not report the signature ID number and synchronization timing deviation amount to the higher layer. Further, when the signature is for handover, the preamble detecting section 1201 outputs a correlation result to the message transmission determining section 1202. The message transmission determining section 1202 determines whether or not to perform transmission and reception of a handover complete message (Message 3) and subsequent message from the correlation result from the preamble detecting section 1201, and notifies the higher layer of the result as flag information.

Figure 13:
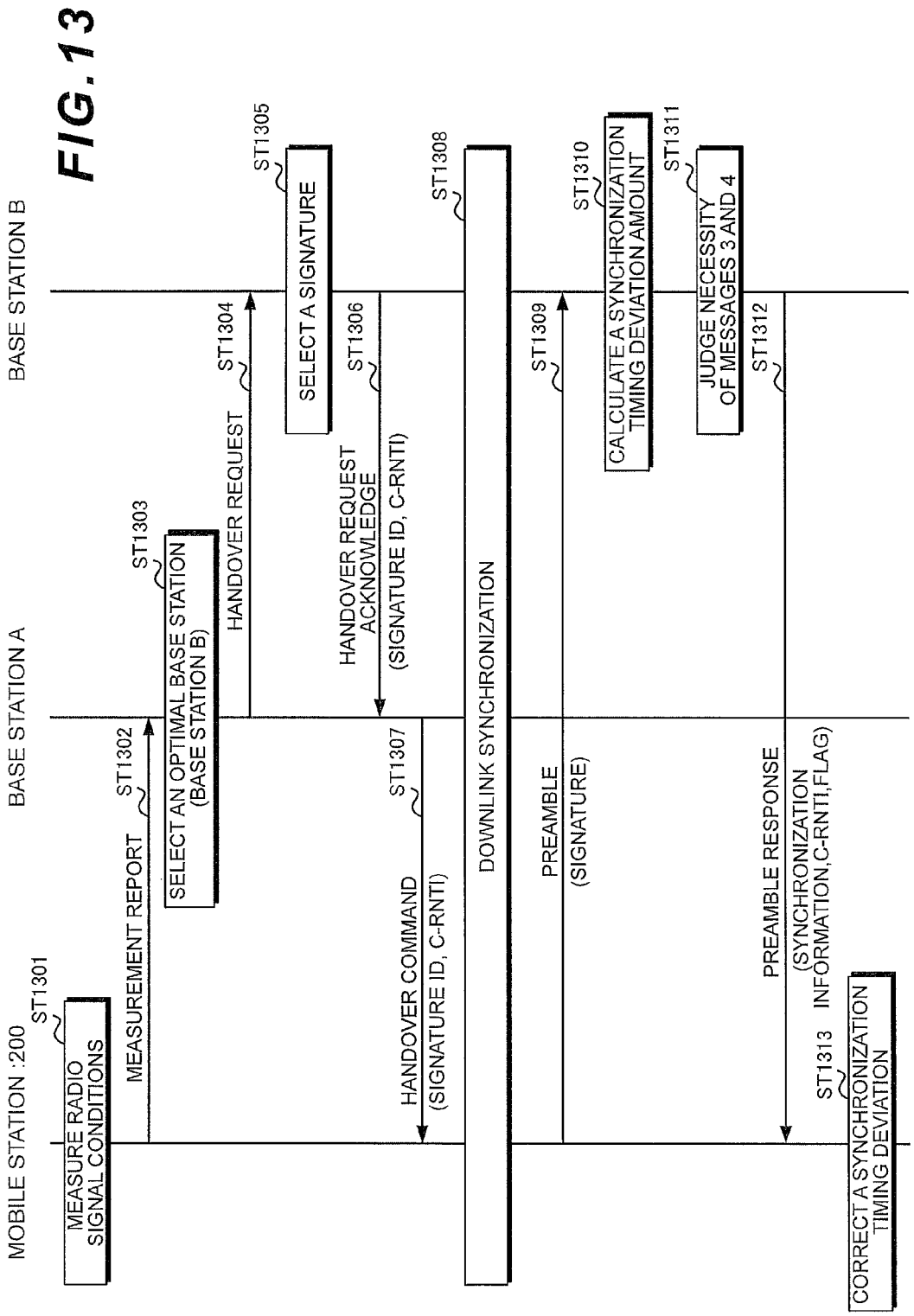
FIG. 13 is a sequence chart to explain an example of a random access procedure at the time of executing handover in the communication system according to Embodiment 3.
Figure 14:
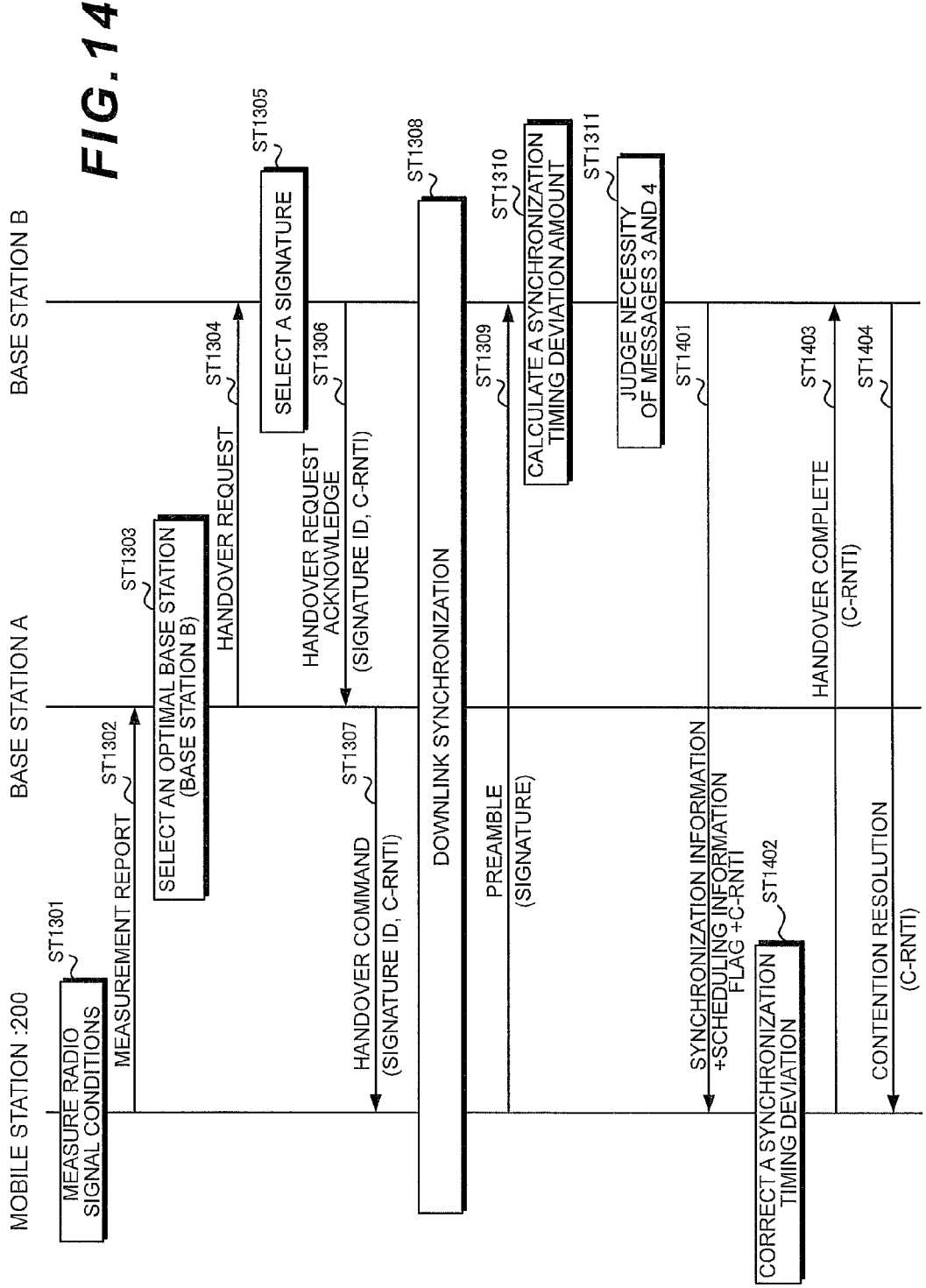
FIG. 14 is a sequence chart to explain an example of another random access procedure at the time of executing handover in the communication system according to Embodiment 3.

Described next is an example of a random access procedure at the time of executing handover in the communication system according to Embodiment 3. FIGS. 13 and 14 are sequence charts to explain an example of a random access procedure at the time of executing handover in the communication system according to Embodiment 3. FIG. 13 shows the case of not performing transmission and reception of a handover complete message (Message 3) and contention resolution (Message 4), and FIG. 14 shows the case of performing transmission and reception of these messages. In addition, it is assumed herein that the mobile station 200 is currently held by a base station 1200A (hereinafter, referred to as a "base station A" as appropriate). Further, in FIG. 14, the same processing as shown in FIG. 13 is assigned the same symbol to omit descriptions thereof.

As shown in FIGS. 13 and 14, in the random access procedure at the time of executing handover in the communication system according to Embodiment 3, as a preparatory stage of handover, the mobile station 200 first measures radio signal conditions of adjacent base stations (ST1301). Then, the mobile station 200 transmits the measurement result (measurement report) to the base station A that is the local-base station (ST1302).

Upon receiving the measurement result from the mobile station 200, the base station A selects a base station optimal as a handover destination from the measurement result (ST1303). In addition, herein, as the optimal base station, a base station 1200B (hereinafter, referred to as a "base station B" as appropriate) is assumed to be selected. Then, the base station A transmits a handover request message to the base station B that is a handover destination (ST1304).

Upon receiving the handover request message from the base station A, the base station B selects one signature from among signatures for handover (ST1305). In this case, in order to avoid the collision between mobile stations to perform handover at the time of random access, the base station B selects a signature from among signatures except signatures used in the base station B.

Then, after assigning C-RNTI to the mobile station 200 to perform handover, the base station B transmits a handover request acknowledge message including the signature ID number and C-RNTI to the base station A as a response to the handover request message (ST1306).

Upon receiving the handover request acknowledge message from the base station B, the base station A transmits a handover command message including the signature ID number and C-RNTI to the mobile station 200 (ST1307).

Upon receiving the handover command message from the base station A, the mobile station 200 acquires downlink synchronization with the base station B, and checks a position of the random access channel from the broadcast channel (ST1308). After acquiring downlink synchronization, the mobile station 200 selects the signature ID number added to the handover command message, and transmits a preamble (random access preamble: Message 1) including the signature ID number to the base station B on the random access channel (ST1309).

The base station B detects the signature from the preamble received from the mobile station 200. When the base station B confirms that the signature is a signature for handover, the base station B calculates a synchronization timing deviation amount (ST1310). Then, from reception conditions of the preamble, the base station B judges whether transmission and reception of a handover complete message (Message 3) and contention resolution (Message 4) is necessary (ST1311).

In this judgment, when correlation characteristics of the preamble are higher than a threshold, the base station B judges that propagation path conditions are good, and that transmission and reception of a handover complete message (Message 3) and contention resolution (Message 4) is not performed. Alternately, when correlation characteristics of the preamble are lower than the threshold, the base station B judges that propagation path conditions are poor, and that transmission and reception of a handover complete message (Message 3) and contention resolution (Message 4) is performed to obtain reliability.

Herein, when it is determined that transmission and reception of a handover complete message (Message 3) and content ion resolution (Message 4) is not necessary, the base station B transmits a preamble response (Message 2) including the synchronization timing deviation information (synchronization information), C-RNTI and message necessity to the mobile station 200 (ST1312).

Upon receiving these pieces of information from the base station B, the mobile station 200 recognizes the information as data to the mobile station 200, corrects the synchronization timing deviation from the synchronization information (ST1313), checks the message necessity flag, and waits for data from the base station 1200. In addition, when there is data for the mobile station 200 to transmit on uplink, the base station 1200 performs uplink scheduling, and includes also the scheduling information in the preamble response (Message 2) to transmit to the mobile station 200. In this case, upon receiving the data to the station 200, the mobile station 200 corrects the synchronization timing deviation from the synchronization information, checks the message necessity flag and starts transmission of the data of the mobile station 200 with resources subjected to scheduling.

Meanwhile, when the base station B judges that transmission and reception of a handover complete message (Message 3) and contention resolution (Message 4) is required, the base station B performs scheduling for transmitting a handover complete message, and as shown in FIG. 14, transmits a preamble response (Message 2) including the synchronization information, scheduling information, message necessity flag and C-RNTI to the mobile station 200 (ST1401). In addition, in this case, since the mobile station 200 is beforehand notified of C-RNTI, the signature ID number is not necessary as the identification information for the mobile station 200 to identify the data to the station 200, and C-RNTI is only required.

Upon receiving the data to the mobile station 200, the station 200 corrects the synchronization timing deviation from the synchronization information (ST1402). Then, the mobile station 200 checks the message necessity flag, and transmits a handover complete message including C-RNTI with resources subjected to scheduling to the base station B (ST1403).

Upon receiving the handover complete message, the base station B generates a contention resolution (Message 4) to transmit to the mobile station 200 (ST1404). Thereafter, the base station B completes the handover. Meanwhile, the mobile station 200 receives the contention resolution (Message 4) and completes the handover.

Figure 15:
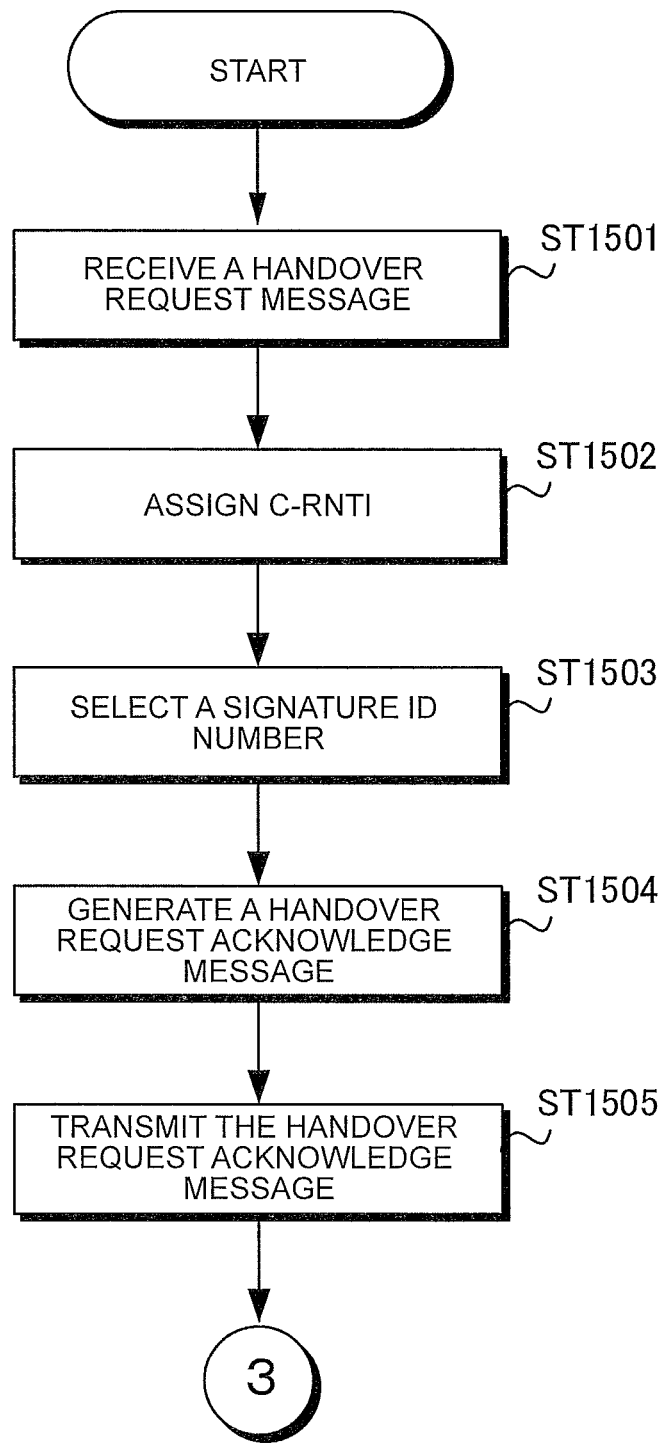
FIG. 15 is a flowchart to explain operation at the time of executing handover in the base station apparatus included in the communication system according to Embodiment 3.
Figure 16:
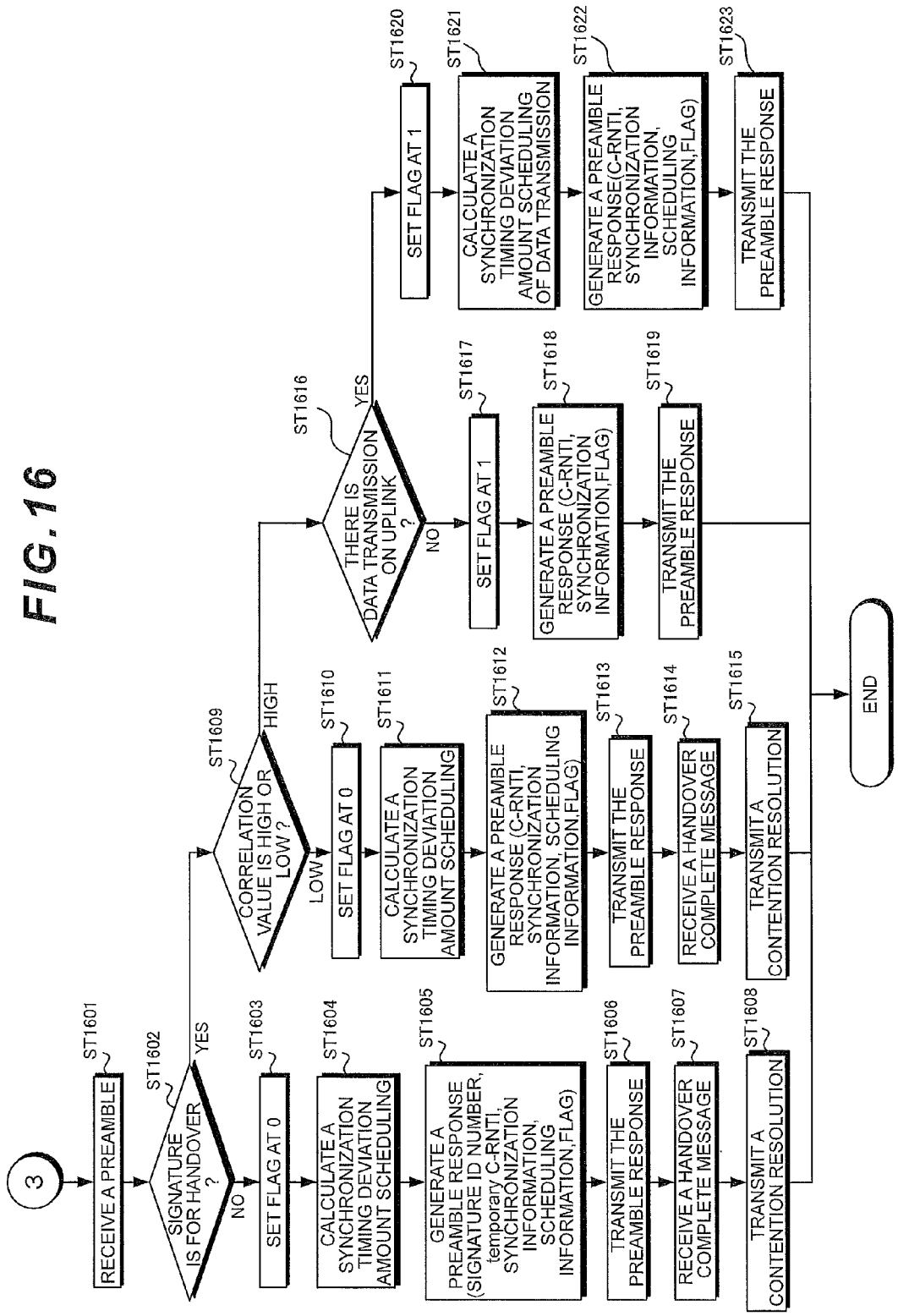
FIG. 16 is another flowchart to explain operation at the time of executing handover in the base station apparatus included in the communication system according to Embodiment 3.

Described herein is operation at the time of executing handover in the base station 1200 included in the communication system according to Embodiment 3. FIGS. 15 and 16 are flowcharts to explain the operation at the time of executing handover in the base station 1200 included in the communication system according to Embodiment 3. In addition, it is assumed that FIGS. 15 and 16 show the operation of the base station B (base station that is a handover destination) as shown in FIGS. 13 and 14. The operation at the time of executing handover in the mobile station 200 is the same as the operation shown in FIG. 6 and descriptions thereof are omitted.

As shown in FIG. 15, upon receiving a handover request message from the base station A (ST1501), the base station B assigns C-RNTI of the mobile station 200, while selecting a signature ID number to be used by the mobile station 200 (ST1502, ST1503). Then, the base station B generates a handover request acknowledge message including the signature ID number and C-RNTI as a response to the handover request message (ST1504), and transmits this handover request acknowledge message to the base station A (ST1505).

After transmitting the handover request acknowledge message, the base station B waits for a preamble (Message 1) to be transmitted from the mobile station 200. Then, as shown in FIG. 16, upon receiving a preamble transmitted from the mobile station 200 (ST1601), the base station B judges whether a signature included in the preamble is a signature for handover (ST1602).

Herein, when the signature is not a signature for handover, the base station B sets a message necessity flag at "0" (ST1603). Then, the base station B calculates a synchronization timing deviation amount, while performing scheduling for transmitting a handover complete message (Message 3)

(ST1604). Then, the base station B generates a preamble response (Message 2) including the signature ID number, temporary C-RNTI, synchronization information, scheduling information and message necessity flag (ST1605). Then, the base station B transmits this preamble response to the mobile station 200 (ST1606).

After transmitting the preamble response, the base station B waits for a handover complete message (Message 3) to be transmitted from the mobile station 200. Then, upon receiving a handover complete message transmitted from the mobile station 200 (ST1607), the base station B transmits a contention resolution (Message 4) including C-RNTI to the mobile station 200 (ST1608).

Meanwhile, when the signature is a signature for handover, the base station B judges whether or not to perform transmission and reception of a handover complete message (Message 3) and contention resolution (Message 4) i.e. whether a correlation value of the preamble is higher or lower than a given value (ST1609) for a flag.

When the correlation value of the preamble is lower than the given value, the base station B sets a message necessity flag at "0" (ST1610). Then, the base station B calculates a synchronization timing deviation amount, while performing scheduling for transmitting a handover complete message (Message 3) (ST1611). Then, the base station B generates a preamble response (Message 2) including the signature ID number, C-RNTI, synchronization information, scheduling information and message necessity flag (ST1612). Then, the base station B transmits this preamble response to the mobile station 200 (ST1613).

After transmitting the preamble response, the base station B waits for a handover complete message (Message 3) to be transmitted from the mobile station 200. Then, upon receiving a handover complete message transmitted from the mobile station 200 (ST1614), the base station B transmits a contention resolution (Message 4) including C-RNTI to the mobile station 200 (ST1615).

Meanwhile, when the correlation value of the preamble is higher than the given value in ST1609, the base station B judges whether uplink data transmission to the base station 1200 is performed in the mobile station 200 (ST1616). Herein, when uplink data transmission is not performed, the base station B sets a message necessity flag at "1" (ST1617). Then, the base station B calculates a synchronization timing deviation amount, and generates a preamble response (Message 2) including C-RNTI, the synchronization information and message necessity flag (ST1618). Then, the base station B transmits this preamble response to the mobile station 200 (ST1619).

Meanwhile, when uplink data transmission is performed, after setting a message necessity flag at "1" (ST1620), the base station B calculates a synchronization timing deviation amount, and performs scheduling for transmitting the data (ST1621). Then, the base station B generates a preamble response (Message 2) including C-RNTI, the synchronization information, scheduling information and message necessity flag (ST1622). Then, the base station B transmits this preamble response to the mobile station 200 (ST1623). Thus, a series of operation at the time of executing handover is finished in the base station 1200.

Thus, in the communication system according to Embodiment 3, the base station B judges whether or not to perform transmission and reception of a handover complete message (Message 3) and contention resolution (Message 4) based on propagation path conditions in receiving the preamble, and it is thereby possible to shorten the connection time for the mobile station 200 with good propagation path conditions. Meanwhile, it is possible to perform conventional stable handover for the mobile station 200 with poor propagation path conditions.

(Embodiment 4)

In a communication system according to Embodiment 4, while Qos of traffic in the mobile station 200 to perform handover is considered, the presence or absence of transmission and reception of a handover complete message (Message 3) and contention resolution (Message 4) is determined corresponding to whether or not the signature selected in the base station is a signature for handover. In other words, this Embodiment corresponds to an Embodiment obtained by combining the communication systems according to Embodiments 1 and 2.

Figure 17:
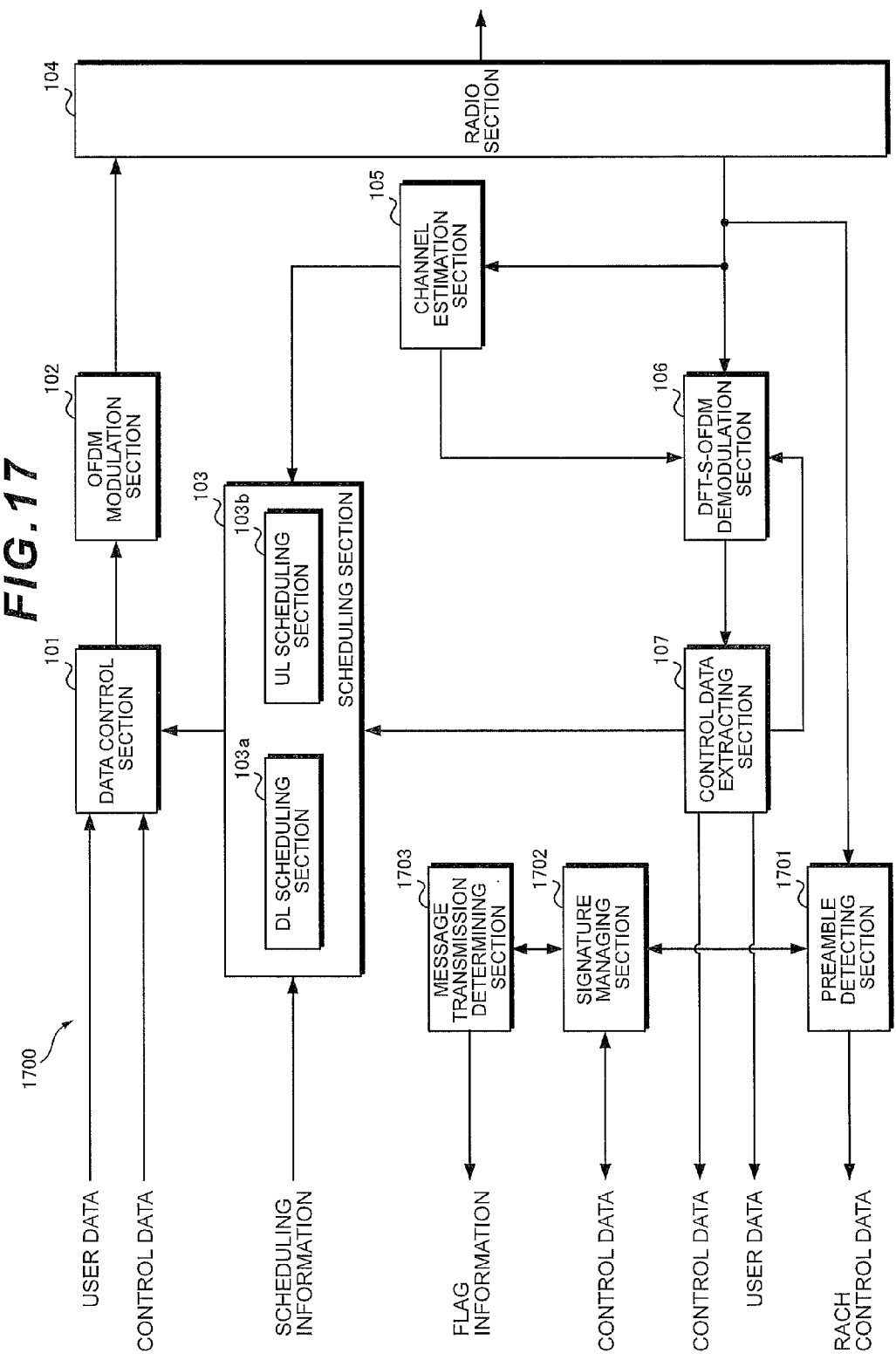
FIG. 17 is a block diagram showing an example of a configuration of a base station apparatus included in a communication system according to Embodiment 4 of the invention.

Described below are configurations of a base station and mobile station included in the communication system according to Embodiment 4. FIG. 17 is a block diagram showing an example of a configuration of the base station 1700 included in the communication system according to Embodiment 4. In addition, in the base station 1700 as shown in FIG. 17, the same components as in FIG. 1 are assigned the same symbols to omit descriptions thereof. Further, the mobile station included in the communication system according to Embodiment 4 has the same configuration as in the mobile station 200 according to Embodiment 1 shown in FIG. 2, and descriptions thereof are omitted.

The base station 1700 as shown in FIG. 17 has a preamble detecting section 1701, signature managing section 1702 and message transmission determining section 1703, and in this respect, differs from the base station 100 according to Embodiment 1. In the base station 1700 according to Embodiment 4, the preamble detecting section 1701 detects a preamble, calculates a synchronization timing deviation amount, and reports the signature ID number and synchronization timing deviation amount to the higher layer. When the signature ID number is a signature selected in the signature managing section 1702, the preamble detecting section 1701 notifies the signature managing section 1702 of the signature ID number.

The signature managing section 1702 receives Qos information from the higher layer, and selects a signature to notify the higher layer. The section 1702 selects a signature from among signatures for handover when Qos of traffic is of high real-time characteristics, while selecting a signature from among signatures for uses except handover when Qos of traffic is of low real-time characteristics. Further, the section 1702 checks signature numbers being used, and selects a signature from among signatures except the used signatures. Moreover, the section 1702 stores the selected signature ID number, and deletes the signature detected in the preamble detecting section 1701 from the stored content. The section 1702 notifies the preamble detecting section 1701 and message transmission determining section 1703 of the selected signature ID number. The message transmission determining section 1703 determines whether or not to perform transmission and reception of a handover complete message (Message 3) and contention resolution (Message 4) from the signature information from the signature managing section 1702, and notifies the higher layer of the result as flag information.

Figure 18:
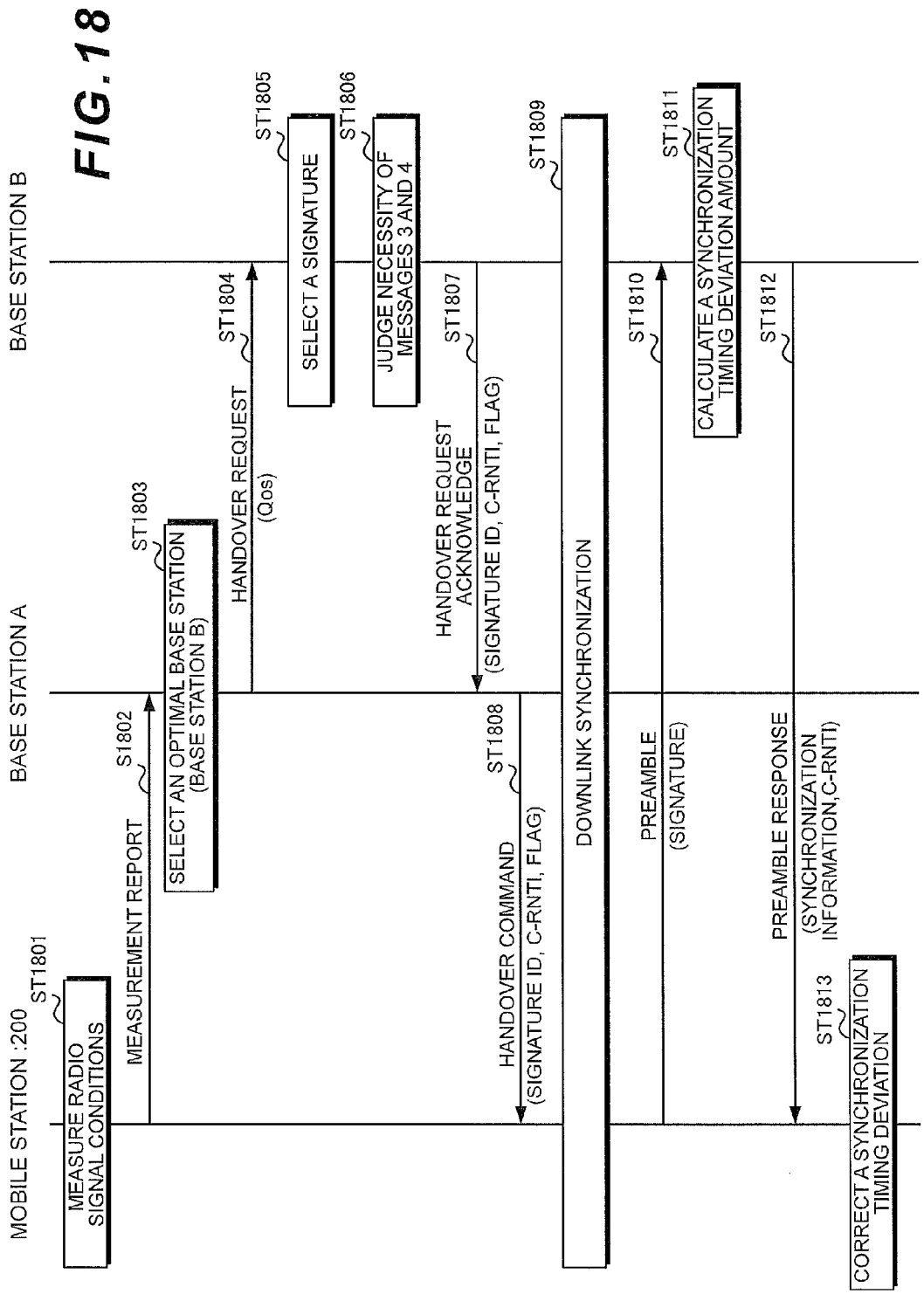
FIG. 18 is a sequence chart to explain an example of a random access procedure at the time of executing handover in the communication system according to Embodiment 4.
Figure 19:
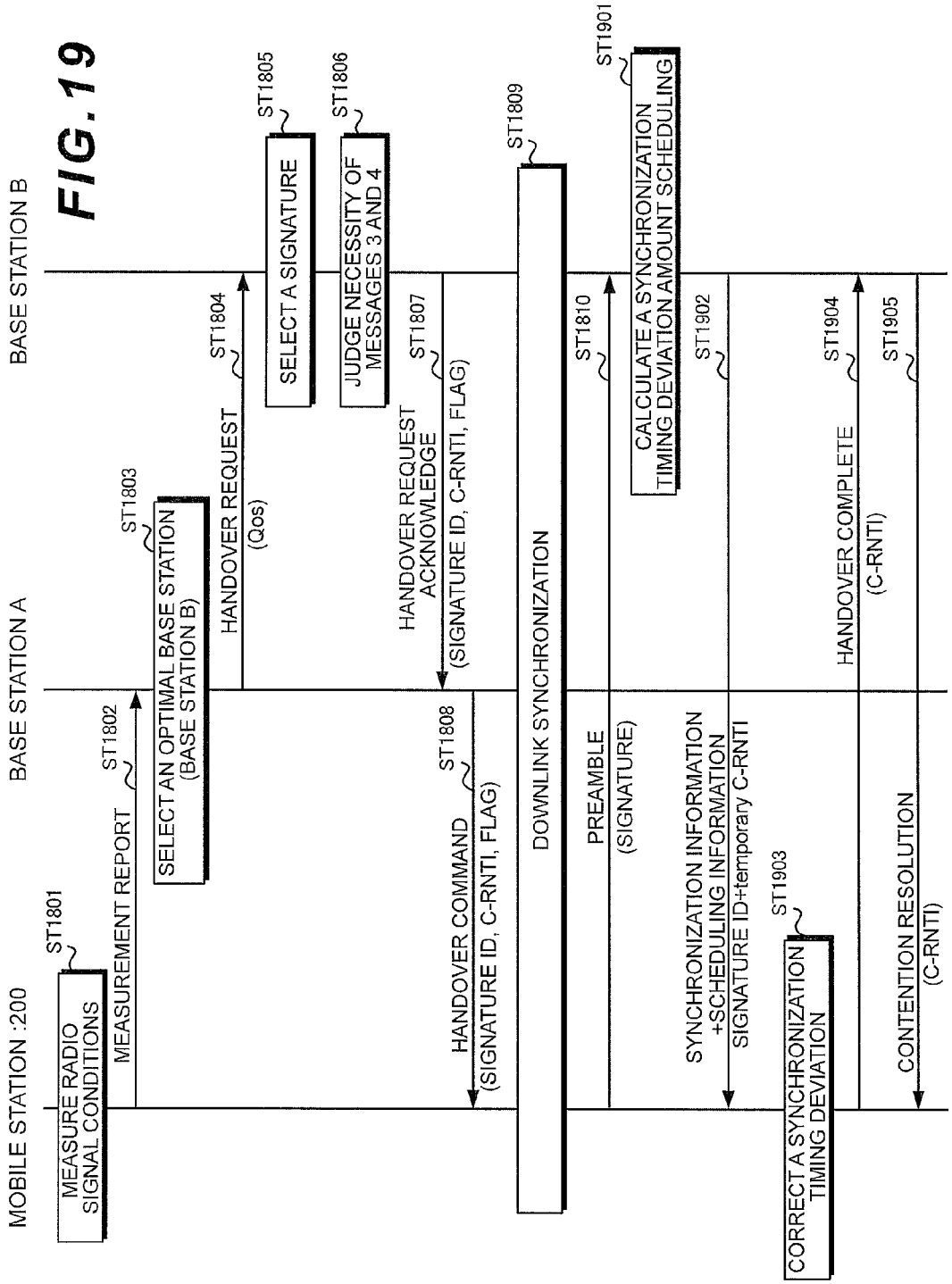
FIG. 19 is a sequence chart to explain an example of another random access procedure at the time of executing handover in the communication system according to Embodiment 4.

Described next is an example of a random access procedure at the time of executing handover in the communication system according to Embodiment 4. FIGS. 18 and 19 are sequence charts to explain an example of a random access procedure at the time of executing handover in the communication system according to Embodiment 4. FIG. 18 shows the case of not performing transmission and reception of a handover complete message (Message 3) and contention resolution (Message 4), and FIG. 19 shows the case of performing transmission and reception of these messages. In addition, it is assumed herein that the mobile station 200 is currently held by a base station 100A (hereinafter, referred to as a "base station A" as appropriate).

As shown in FIGS. 18 and 19, in the random access procedure at the time of executing handover in the communication system according to this Embodiment, as a preparatory stage of handover, the mobile station 200 first measures radio signal conditions of adjacent base stations (ST1801). Then, the mobile station 200 transmits the measurement result (measurement report) to the base station A that is the local-base station (ST1802).

Upon receiving the measurement result from the mobile station 200, the base station A selects a base station optimal as a handover destination from the measurement result (ST1803). In addition, herein, as the optimal base station, a base station 1700B (hereinafter, referred to as a "base station B" as appropriate) is assumed to be selected. Then, the base station A transmits a handover request message including Qos information of traffic of the mobile station 200 to the base station B that is a handover destination (ST1804).

Upon receiving the handover request message from the base station A, the base station B checks Qos of traffic of the mobile station 200 to perform handover, and selects one signature from among signatures for handover when Qos of traffic is of high real-time characteristics. Meanwhile, when Qos of traffic is of low real-time characteristics, the base station B selects one signature from among ordinary signatures (ST1805). In this case, in order to avoid the collision between mobile stations 200 to perform handover at the time of random access, the base station B selects a signature from among signatures except signatures used in the base station B.

Further, based on the signature to use, the base station B judges whether or not to perform transmission and reception of a handover complete message (Message 3) and contention resolution (Message 4) (ST1806). In addition, in this judgment, in the case of a signature for handover, since the collision does not occur, the base station B judges that transmission and reception of a handover complete message (Messages 3) and contention resolution (Message 4) is not performed. Meanwhile, in the case of a signature for use except handover, since there is a possibility that the collision occurs, the base station B judges that transmission and reception of a handover complete message (Message 3) and contention resolution (Message 4) is performed.

Then, after assigning C-RNTI to the mobile station 200 to perform handover, the base station B transmits a handover request acknowledge message including the signature ID number, message necessity flag and C-RNTI to the base station A as a response to the handover request message (ST1807).

Upon receiving the handover request acknowledge message from the base station B, the base station A transmits a handover command message including the signature ID number, message necessity flag and C-RNTI to the mobile station 200 (ST1808).

Upon receiving the handover command message from the base station A, the mobile station 200 checks the message necessity flag, acquires downlink synchronization with the base station B, and checks a position of the random access channel from the broadcast channel (ST1809). After acquiring downlink synchronization, the mobile station 200 selects the signature ID number added to the handover command message, and transmits a preamble (random access preamble: Message 1) including the signature ID number to the base station B on the random access channel (ST1810).

The base station B detects the signature from the preamble received from the mobile station 200. The processing differs corresponding to the type of signature. When the base station B confirms that the signature is a signature for handover, as shown in FIG. 18, the base station B calculates a synchronization timing deviation amount (ST1811). Then, the base station B transmits a preamble response (Message 2) including the synchronization timing deviation information (synchronization information) and C-RNTI to the mobile station 200 (ST1812). In addition, when there is data for the mobile station to transmit on uplink, the base station B performs uplink scheduling, and includes also the scheduling information in the preamble response (Message 2) to transmit to the mobile station 200.

Upon receiving these pieces of information from the base station B, the mobile station 200 recognizes the information as data to the mobile station 200, and corrects the synchronization timing deviation from the synchronization information (ST1813). Thereafter, the mobile station 200 completes the handover.

Meanwhile, when the base station B confirms that the signature is a signature for use except handover designated by the base station 1700, as shown in FIG. 19, the base station B calculates a synchronization timing deviation amount, and performs scheduling for transmitting a handover complete message (ST1901). Then, the base station B transmits a preamble message (Message 2) including the synchronization information, scheduling information, signature ID number, and temporary C-RNTI to the mobile station 200 (ST1902).

Upon receiving these pieces of information from the base station B, the mobile station 200 recognizes the information as data to the mobile station 200, and corrects the synchronization timing deviation from the synchronization information (ST1903). Then, the mobile station 200 generates a handover complete message including C-RNTI, and transmits the handover complete message (Message 3) with resources subjected to scheduling to the base station B (ST1904).

Upon receiving the handover complete message (Message 3), the base station B generates a contention resolution (Message 4) to transmit to the mobile station 200 (ST1905). Thereafter, the base station B completes the handover. Meanwhile, the mobile station 200 receives the contention resolution (Message 4) and completes the handover.

Figure 20:
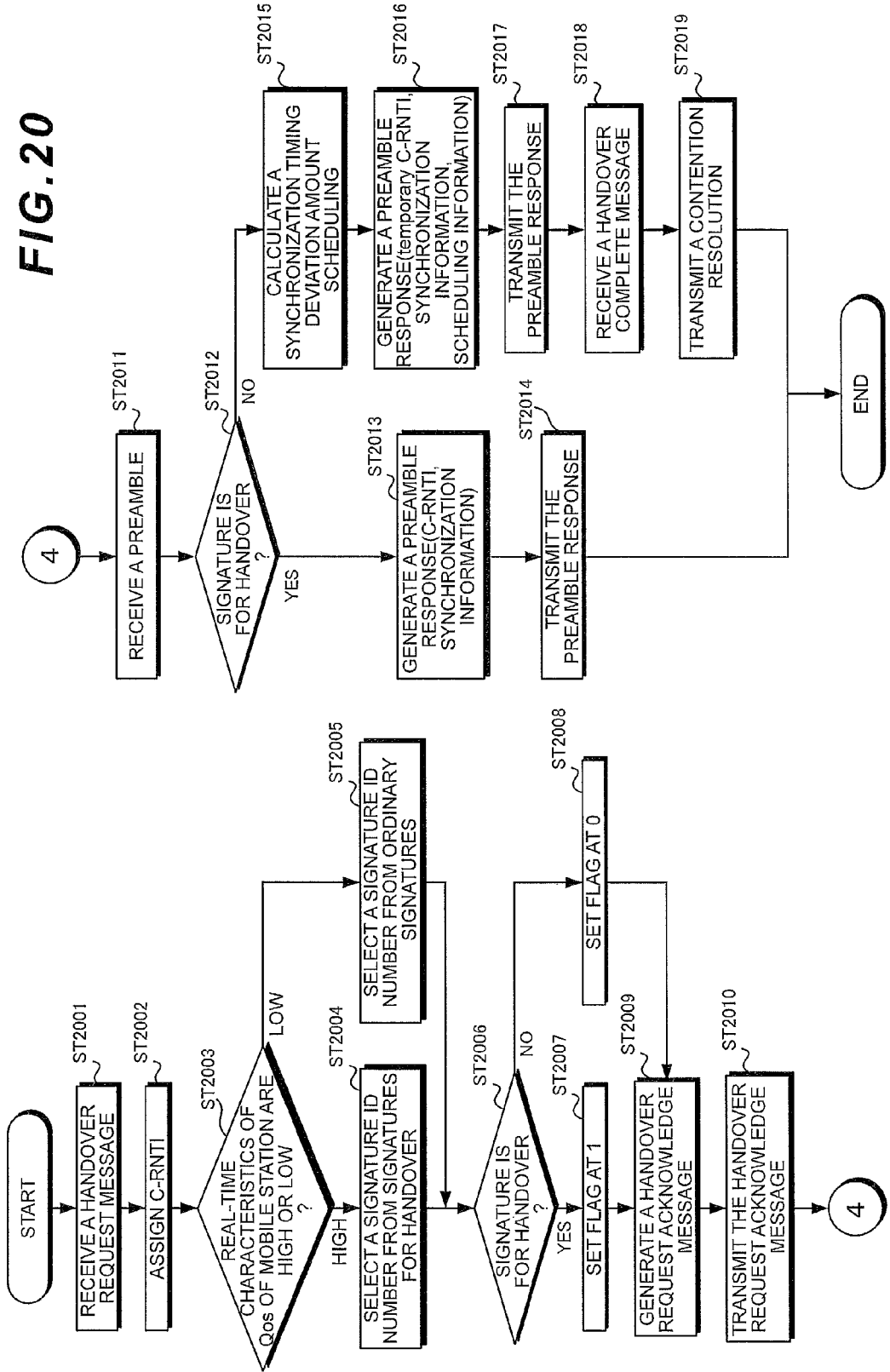
FIG. 20 is a flowchart to explain operation at the time of executing handover in the base station apparatus included in the communication system according to Embodiment 4.
Figure 21:
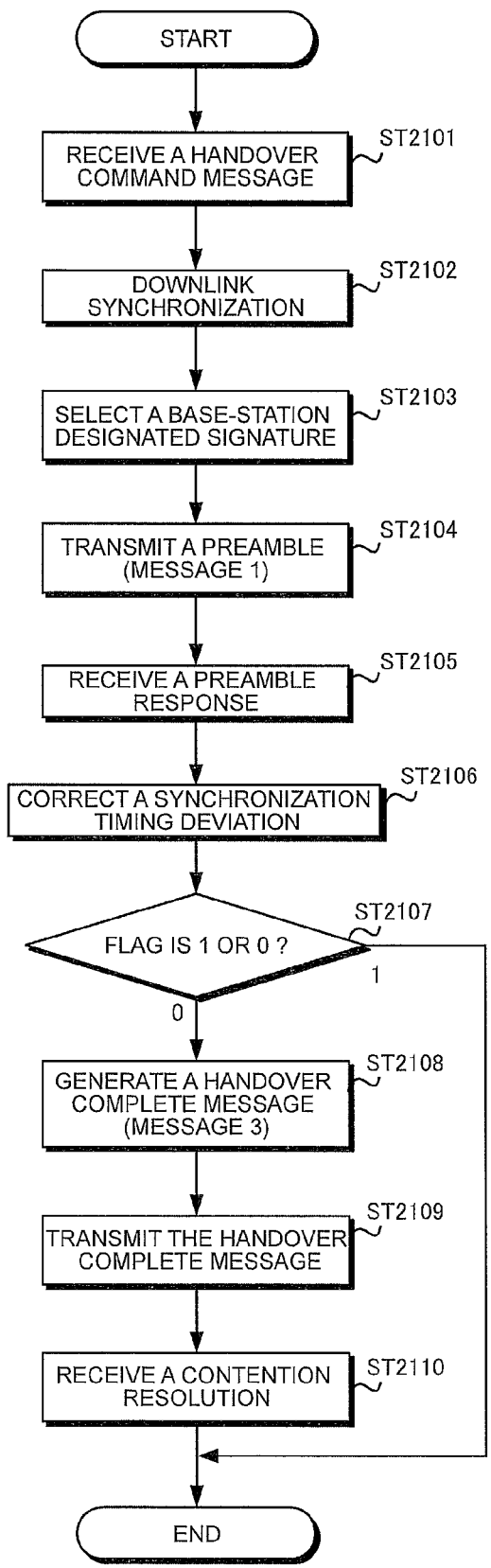
FIG. 21 is a flowchart to explain operation at the time of executing handover in the mobile station apparatus included in the communication system according to Embodiment 4.
Figure 22:
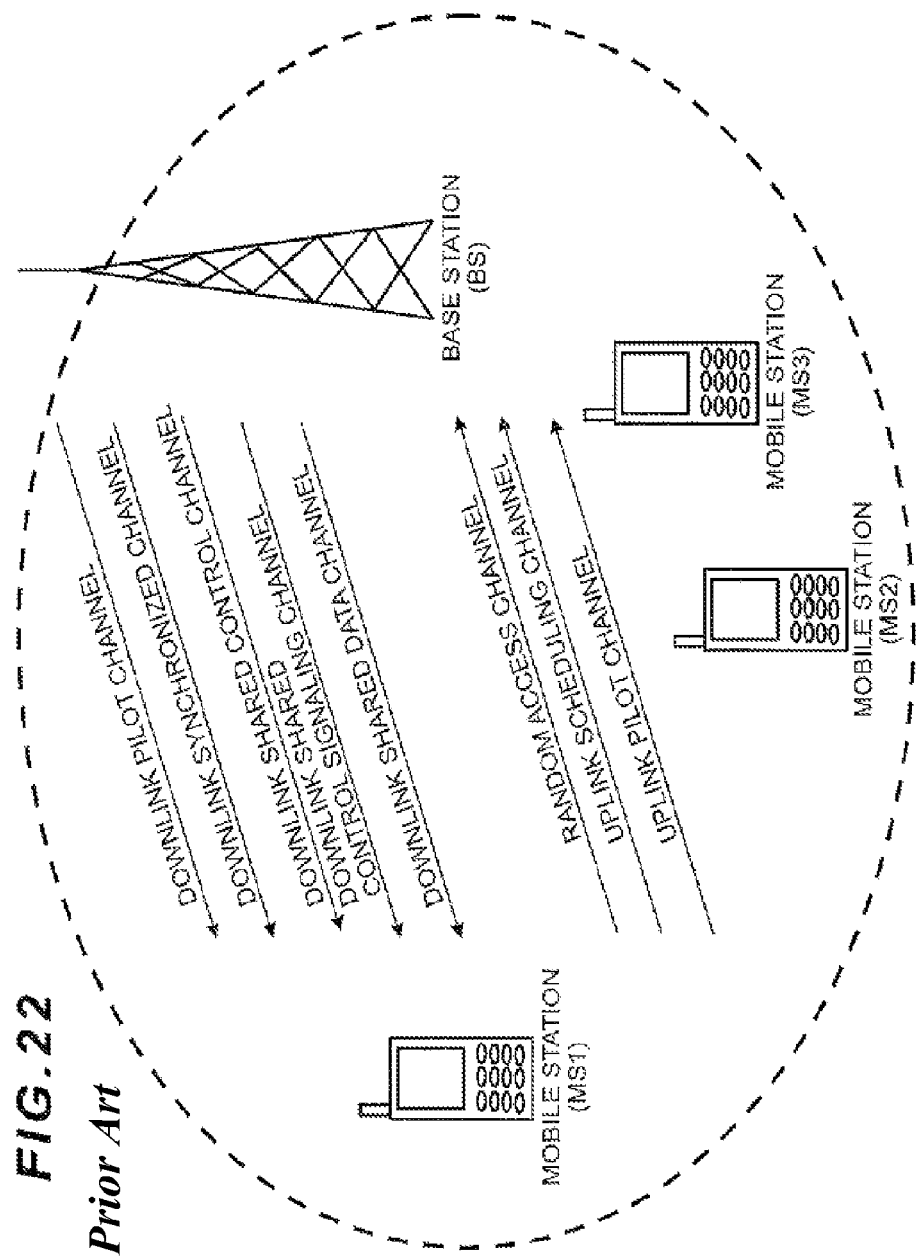
FIG. 22 is a diagram to explain a configuration of uplink in EUTRA.
Figure 23:
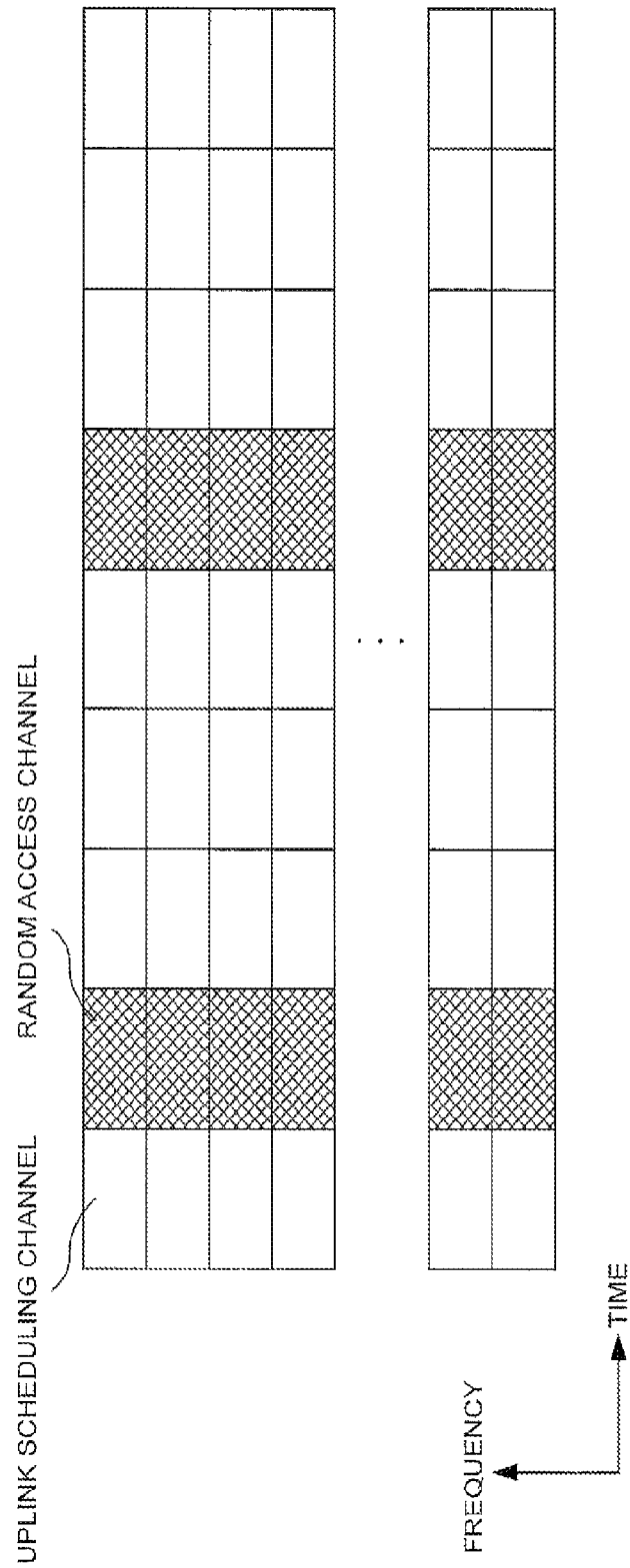
FIG. 23 is a diagram to explain an uplink random access channel in E-UTRA.
Figure 24:
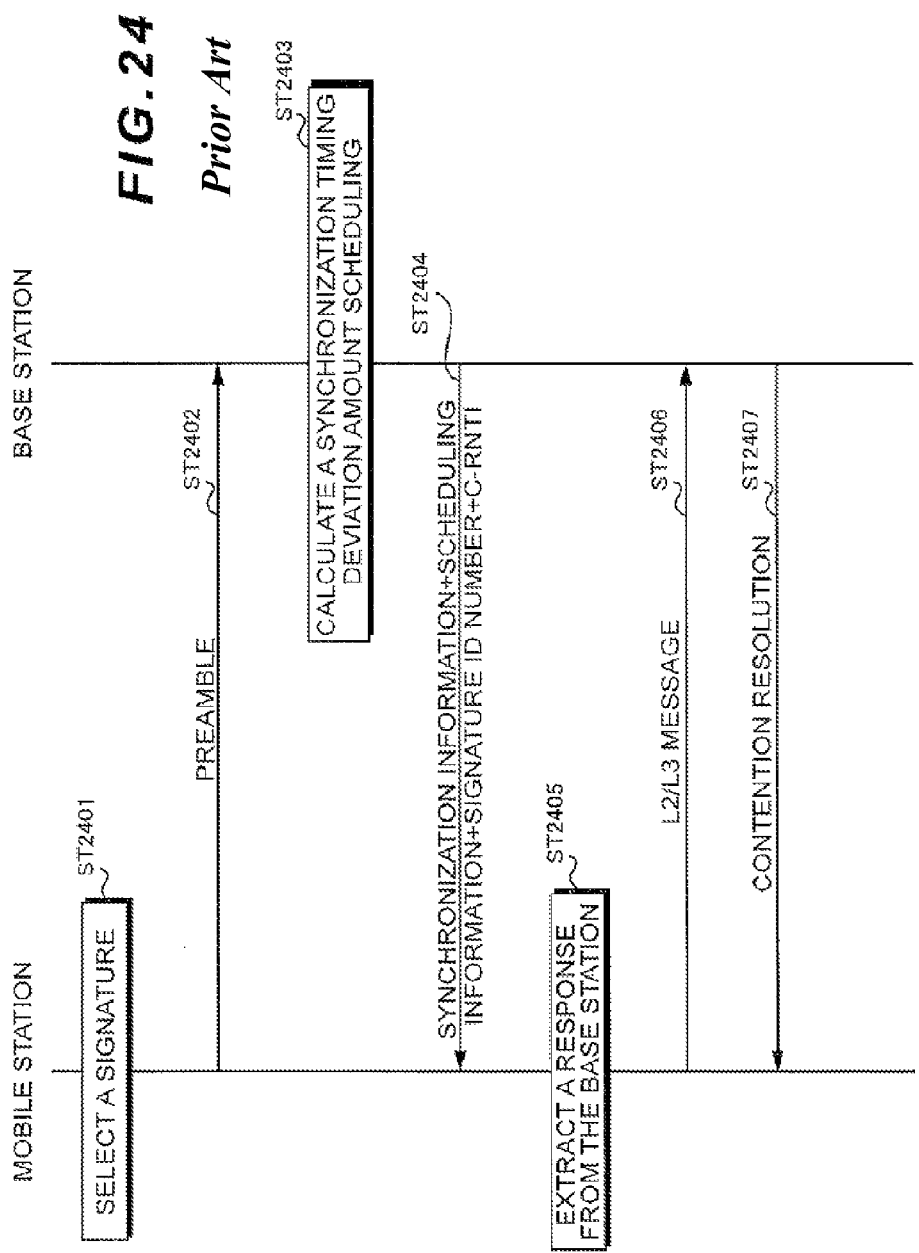
FIG. 24 is a sequence chart to explain an example of a conventional procedure of random access.
Figure 25:
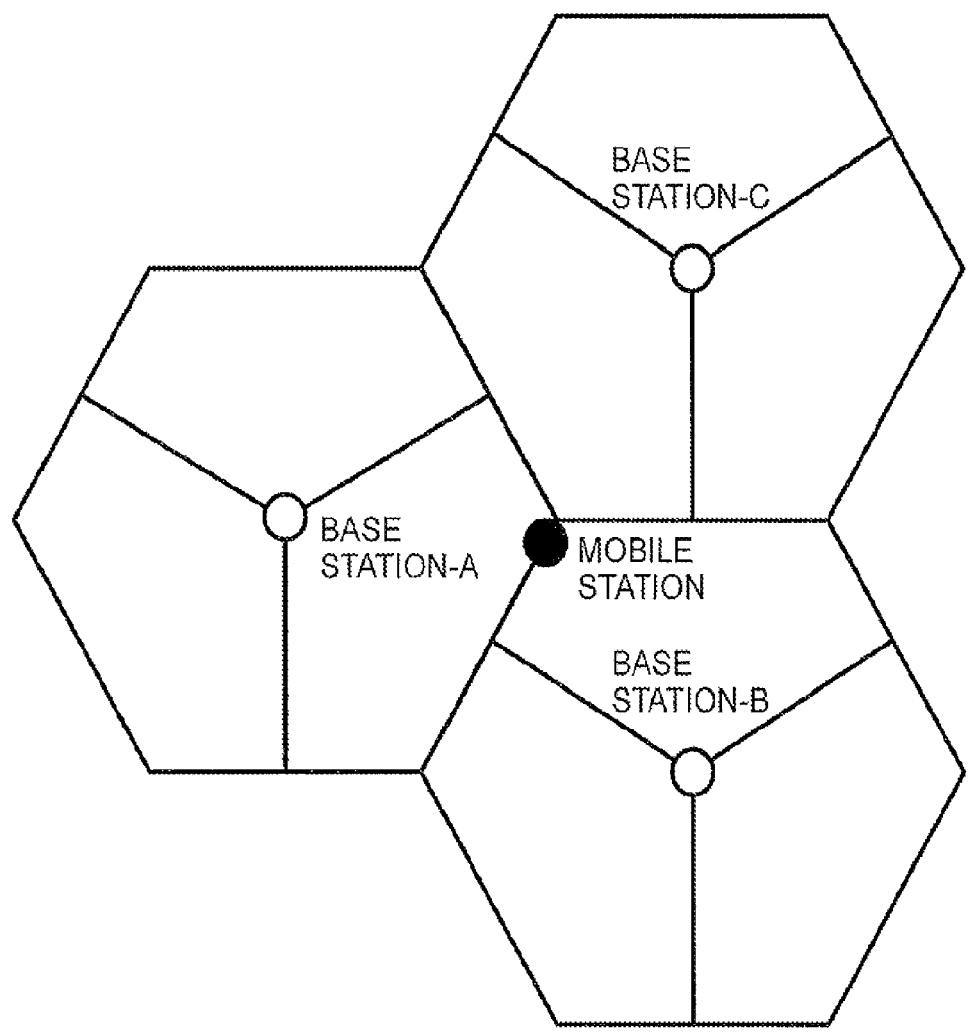
FIG. 25 is a diagram to explain locations of base stations where handover arises.

Described herein are operations at the time of executing handover in the base station 1700 and mobile station 200 included in the communication system according to Embodiment 4. FIG. 20 is a flowchart to explain the operation at the time of executing handover in the base station 1700 included in the communication system according to Embodiment 4. FIG. 21 is a flowchart to explain the operation at the time of executing handover in the mobile station 200 included in the communication system according to Embodiment 4. In addition, it is assumed that FIG. 20 shows the operation of the base station B (base station that is a handover destination) as shown in FIGS. 18 and 19, and that FIG. 21 shows the operation of the mobile station 200 as shown in FIGS. 18 and 19.

As shown in FIG. 20, upon receiving a handover request message from the base station A (ST2001), the base station B assigns C-RNTI of the mobile station 200 (ST2002). Then, the base station B judges Qos information of the mobile station 200 to perform handover (ST2003). More specifically, the base station B judges whether the mobile station 200 to perform handover transmits and receives data with high real-time characteristics or transmits and receives data with low real-time characteristics.

Herein, when the mobile station 200 transmits and receives data with high real-time characteristics, the base station B selects a signature ID number from among signatures for handover (ST2004). Meanwhile, when the mobile station 200 transmits and receives data with low real-time characteristics, the base station B selects a signature ID number from among ordinary signatures (ST2005). Then, the base station B judges whether the selected signature is a signature for handover (ST2006).

When the signature is a signature for handover, the base station B sets a message necessity flag at "1" indicative of no need of transmission and reception of a handover complete message (Message 3) and contention resolution (Message 4) (ST2007). Meanwhile, when the signature is not a signature for handover, the base station B sets a message necessity flag at "0" indicative of need of transmission and reception of a handover complete message (Message 3) and contention resolution (Message 4) (ST2008).

Then, the base station B generates a handover request acknowledge message including the signature ID number, C-RNTI and message necessity flag as a response to the handover request message (ST2009), and transmits this handover request acknowledge message to the base station A (ST2010).

After transmitting the handover request acknowledge message, the base station B waits for a preamble (Message 1) to be transmitted from the mobile station 200. Then, upon receiving a preamble transmitted from the mobile station 200 (ST2011), the base station B judges whether a signature included in the preamble is a signature for handover (ST2012).

Herein, when the signature is a signature for handover, the base station B calculates a synchronization timing deviation amount, and generates a preamble response (Message 2) including the synchronization information and C-RNTI (ST2013). Then, the base station B transmits this preamble response to the mobile station 200 (ST2014).

Meanwhile, when the signature is not a signature for handover in ST2012, the base station B calculates a synchronization timing deviation amount, while performing scheduling for transmitting a handover complete message (Message 3) (ST2015). Then, the base station B generates a preamble response (Message 2) including temporary C-RNTI, the synchronization information and scheduling information (ST2016). Then, the base station B transmits this preamble response to the mobile station 200 (ST2017).

After transmitting the preamble response, the base station B waits for a handover complete message (Message 3) to be transmitted from the mobile station 200. Then, upon receiving a handover complete message transmitted from the mobile station 200 (ST2018), the base station B transmits a contention resolution (Message 4) including C-RNTI to the mobile station 200 (ST2019). In this way, a series of operation at the time of executing handover is finished in the base station 1700.

Meanwhile, as shown in FIG. 21, upon receiving a handover command message from the base station A (ST2101), the mobile station 200 acquires downlink synchronization with the base station B (ST2102). After acquiring downlink synchronization, the mobile station 200 selects a signature of the signature ID number included in the handover command message (ST2103). In other words, the mobile station 200 selects a signature designated by the base station B. Then, the mobile station 200 transmits a preamble (Message 1) including the selected signature to the base station B (ST2104).

Upon transmitting the preamble, the mobile station 200 waits for a preamble response (Message 2) to be transmitted from the base station B. Then, upon receiving a preamble message transmitted from the base station B (ST2105), the mobile station 200 corrects a synchronization timing deviation (ST2106), and judges whether a message necessity flag included in the handover command message is "1" or "0" (ST2107).

Herein, when the message necessity flag is "1", the mobile station 200 finishes the processing without any other processing. Meanwhile, when the message necessity flag is "0", the mobile station 200 generates a handover complete message (Message 3) including C-RNTI (ST2108). Then, the mobile station 200 transmits the handover complete message (Message 3) to the base station B (ST2109). When the handover complete message is transmitted, the base station B transmits a contention resolution (Message 4), and the mobile station 200 receives the contention resolution (ST2110). In this way, a series of operation at the time of executing handover is finished in the mobile station 200.

In addition, with respect to the judgment and setting (ST2006~ST2008) of a message necessity flag made in the base station, instead of performing in the base station, the mobile station may make a necessity judgment on transmission and reception of a handover complete message (Message 3) and contention resolution (Message 4) by determining whether a signature included in a notified handover request acknowledge message is a signature for handover or ordinary signature.

Thus, according to the communication system according to Embodiment 4, while Qos of traffic in the mobile station 200 to perform handover is considered, the presence or absence of transmission and reception of a handover complete message (Message 3) and contention resolution (Message 4) is determined corresponding to whether or not the signature selected in the base station is a signature for handover. By this means, it is possible to reduce the time required for transmission and reception of these messages when the messages are not necessary, and it is thereby possible to shorten the time spent at the time of handover while coping with the collision between mobile stations when a large number of handovers occur at the same time. Further, it is possible to shorten the handover time to maintain real-time characteristics for the mobile station 200 that transmits and receives data with high real-time characteristics. Meanwhile, for the mobile station 200 that transmits and receives data with low real-time characteristics, it is possible to perform conventional stable handover.

The present invention is not limited to the above-mentioned Embodiments, and is capable of being carried into practice with various modifications thereof. In the above-mentioned Embodiments, sizes, shapes and the like as shown in the accompanying drawings are not limited thereto, and are capable of being modified as appropriate within the scope of exhibiting the effects of the invention. Moreover, the invention is capable of being carried into practice with modifications thereof as appropriate without departing from the scope of the object of the invention.

The invention claimed is:

1. A method for random access to a first base station at a time of handover, comprising:
   receiving, by a mobile station, a notification of a number used for random access from a second base station;
   determining, by the mobile station, whether or not the number indicates a signature ID number for handover;
   sending, by the mobile station, a random access preamble corresponding to the number if the number indicates a signature ID number for handover; and
   performing, by the mobile station, contention resolution processing if the number does not indicate a signature ID number for handover.

2. The method according to claim 1, wherein the number is determined by the first base station and transmitted to the second base station.

3. The method according to claim 1, wherein performing the contention resolution processing comprises:
   randomly selecting, by the mobile station, a signature ID number; and
   sending, by the mobile station, a random access preamble corresponding to the randomly selected signature ID number.

4. A method for random access at a time of handover, the method comprising:
   selecting, by a first base station, a number used for random access;
   sending, by the first base station, the number to a mobile station via a second base station;
   receiving, by the first base station, a random access preamble corresponding to the number if the number indicates a signature ID number for handover; and
   receiving, by the first base station, a random access preamble corresponding to a signature ID number randomly selected by the mobile station if the number does not indicate a signature ID number for handover.

5. A mobile station for random access to a first base station at a time of handover, the mobile station comprising:
   a receiver, configured to receive a notification of a number used for random access from a second base station;
   a scheduling section, configured to determine whether the number indicates a signature ID number for handover; and
   a transmitter, configured to send a random access preamble corresponding to the number if the number indicates a signature ID number for handover, and to perform a contention resolution processing if the number does not indicate a signature ID number for handover.

6. The mobile station according to claim 5, wherein the number is determined by the first base station and transmitted to the second base station.

7. The mobile station according to claim 5, further comprising:
   a signature selecting section, configured to randomly select a signature ID number; and
   a preamble generating section, configured to generate a random access preamble corresponding to the randomly selected signature ID number;
   wherein the contention resolution processing is performed by sending the generated random access preamble corresponding to the randomly selected signature ID number.

8. A base station for random access at a time of handover, the base station comprising:
   a signature managing section, configured to select a number used for random access;
   a transmitter, configured to send the number to a mobile station via another base station; and
   a receiver, configured to receive a random access preamble corresponding to the number if the number indicates a signature ID number for handover, and to receive a random access preamble corresponding to a signature ID number randomly selected by the mobile station if the number does not indicate a signature ID number for handover.

* * * * *